United States Patent
Hashimoto et al.

(10) Patent No.: US 11,654,915 B2
(45) Date of Patent: May 23, 2023

(54) METHOD OF GENERATING VEHICLE CONTROL DATA, VEHICLE CONTROL DEVICE, AND VEHICLE CONTROL SYSTEM

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 16/948,973

(22) Filed: Oct. 8, 2020

(65) Prior Publication Data
US 2021/0114596 A1 Apr. 22, 2021

(30) Foreign Application Priority Data
Oct. 18, 2019 (JP) .............. JP2019-191093

(51) Int. Cl.
B60W 30/182 (2020.01)
B60W 10/06 (2006.01)
G06F 18/21 (2023.01)

(52) U.S. Cl.
CPC .......... *B60W 30/182* (2013.01); *B60W 10/06* (2013.01); *G06F 18/217* (2023.01);
(Continued)

(58) Field of Classification Search
None
See application file for complete search history.

(56) References Cited

U.S. PATENT DOCUMENTS

| 5,410,477 A | 4/1995 | Ishii et al. |
| 5,532,929 A | 7/1996 | Hattori et al. |

(Continued)

FOREIGN PATENT DOCUMENTS

| AU | 2020256309 A1 * | 5/2021 | ......... F02D 41/0215 |
| AU | 2020256347 A1 * | 5/2021 | ........ B60W 50/0098 |

(Continued)

OTHER PUBLICATIONS

Office Action dated Dec. 8, 2021 in co-pending U.S. Appl. No. 17/066,862, 7 pages.

(Continued)

*Primary Examiner* — Kevin R Steckbauer
(74) *Attorney, Agent, or Firm* — Oblon, McClelland, Maier & Neustadt, L.L.P.

(57) ABSTRACT

Provided is a method of generating vehicle control data. The method is applied to a vehicle configured to select one of a plurality of traveling control modes and is executed by a processor in a state in which relationship definition data defining a relationship between a state of the vehicle and an action variable as a variable relating to an operation of electronic equipment in the vehicle is stored in a memory. The method includes operation processing for operating the electronic equipment, acquisition processing for acquiring a detection value of a sensor configured to detect the state of the vehicle, reward calculation processing for providing reward, and update processing for updating the relationship definition data.

13 Claims, 10 Drawing Sheets

(52) U.S. Cl.
CPC .............. *B60W 2510/0604* (2013.01); *B60W 2520/105* (2013.01)

(56) References Cited

U.S. PATENT DOCUMENTS

| | | | |
|---|---|---|---|
| 6,549,815 B1 | 4/2003 | Kaji | |
| 6,837,217 B1 | 1/2005 | Hoshino et al. | |
| 8,217,777 B2* | 7/2012 | Sekiyama | G08G 1/127 340/459 |
| 8,897,975 B2* | 11/2014 | Heap | B60W 10/04 701/54 |
| 9,215,598 B2* | 12/2015 | Vuyyuru | H04W 16/14 |
| 9,981,666 B2* | 5/2018 | Ono | B60W 30/18027 |
| 10,337,880 B2* | 7/2019 | Koga | G01C 21/3484 |
| 10,445,758 B1* | 10/2019 | Bryer | G06Q 40/08 |
| 10,455,478 B2* | 10/2019 | Sai | H04W 40/22 |
| 10,752,208 B2* | 8/2020 | Sakurada | G07C 9/00896 |
| 10,776,168 B2* | 9/2020 | Kanada | B60L 58/10 |
| 10,845,815 B2* | 11/2020 | Palanisamy | B60W 50/00 |
| 10,968,855 B2* | 4/2021 | Kitagawa | F02D 41/2474 |
| 11,125,179 B2* | 9/2021 | Hashimoto | F02D 41/266 |
| 11,225,923 B2* | 1/2022 | Hashimoto | F02D 41/1486 |
| 11,226,034 B2* | 1/2022 | Hashimoto | F16H 61/0213 |
| 11,230,984 B2* | 1/2022 | Hashimoto | F02D 41/2422 |
| 11,235,781 B2* | 2/2022 | Hashimoto | B60W 50/045 |
| 11,236,819 B1* | 2/2022 | Fujii | F16H 61/061 |
| 11,248,553 B2* | 2/2022 | Hashimoto | G06Q 50/06 |
| 11,268,467 B2* | 3/2022 | Hashimoto | F02D 41/2422 |
| 11,313,309 B2* | 4/2022 | Hashimoto | F02D 41/0215 |
| 11,332,114 B2* | 5/2022 | Hashimoto | B60W 10/04 |
| 11,377,084 B2* | 7/2022 | Hashimoto | F02D 29/02 |
| 2002/0157639 A1 | 10/2002 | Kidokoro et al. | |
| 2003/0055551 A1 | 3/2003 | Weber et al. | |
| 2004/0098197 A1 | 5/2004 | Matsumoto et al. | |
| 2009/0118923 A1* | 5/2009 | Heap | B60W 20/10 903/945 |
| 2010/0204899 A1 | 8/2010 | Serres | |
| 2012/0117011 A1 | 5/2012 | Hashimoto et al. | |
| 2013/0122819 A1* | 5/2013 | Vuyyuru | H04W 16/14 455/62 |
| 2014/0005848 A1* | 1/2014 | Melen | G06Q 10/06311 700/291 |
| 2014/0006137 A1* | 1/2014 | Melen | B60L 53/63 705/14.35 |
| 2014/0249913 A1* | 9/2014 | Endo | G06Q 30/0246 705/14.45 |
| 2016/0325752 A1* | 11/2016 | Ono | B60W 30/20 |
| 2018/0066593 A1 | 3/2018 | Uezono et al. | |
| 2018/0072317 A1 | 3/2018 | Hiwatashi et al. | |
| 2018/0086349 A1 | 3/2018 | Hiwatashi et al. | |
| 2018/0156630 A1* | 6/2018 | Koga | A61B 5/18 |
| 2018/0288672 A1* | 10/2018 | Sai | H04W 40/22 |
| 2019/0121661 A1* | 4/2019 | Kanada | H02J 7/143 |
| 2019/0202402 A1* | 7/2019 | Sakurada | G07C 9/00571 |
| 2019/0220803 A1* | 7/2019 | Kanaoka | G07C 9/00571 |
| 2019/0242319 A1 | 8/2019 | Matsumoto et al. | |
| 2019/0360421 A1 | 11/2019 | Cancellieri et al. | |
| 2020/0020029 A1* | 1/2020 | Yuza | G06Q 40/025 |
| 2020/0033868 A1* | 1/2020 | Palanisamy | G05D 1/0221 |
| 2020/0033869 A1* | 1/2020 | Palanisamy | B60W 60/00 |
| 2020/0097808 A1* | 3/2020 | Thomas | G06N 3/0445 |
| 2020/0132011 A1* | 4/2020 | Kitagawa | F02D 41/24 |
| 2020/0184500 A1* | 6/2020 | Yuyama | B60W 40/09 |
| 2020/0193460 A1* | 6/2020 | Obara | G07C 5/08 |
| 2020/0263581 A1 | 8/2020 | Muto et al. | |
| 2020/0263618 A1 | 8/2020 | Muto et al. | |
| 2020/0332731 A1 | 10/2020 | Muto et al. | |
| 2020/0333789 A1* | 10/2020 | Suzuki | G05D 1/0297 |
| 2020/0380548 A1* | 12/2020 | Neyama | G01C 21/3407 |
| 2021/0033039 A1 | 2/2021 | Hashimoto et al. | |
| 2021/0056781 A1 | 2/2021 | Hashimoto et al. | |
| 2021/0094587 A1 | 4/2021 | Pilly et al. | |
| 2021/0114579 A1* | 4/2021 | Hashimoto | G07C 5/0841 |
| 2021/0114580 A1* | 4/2021 | Hashimoto | B60W 50/0098 |
| 2021/0114581 A1* | 4/2021 | Hashimoto | B60W 10/06 |
| 2021/0114596 A1* | 4/2021 | Hashimoto | F02D 41/2432 |
| 2021/0114607 A1* | 4/2021 | Hashimoto | G06N 20/00 |
| 2021/0114608 A1* | 4/2021 | Hashimoto | F02D 41/0002 |
| 2021/0114609 A1* | 4/2021 | Hashimoto | G06N 20/00 |
| 2021/0115834 A1* | 4/2021 | Hashimoto | F01N 11/005 |
| 2021/0115866 A1* | 4/2021 | Hashimoto | F02D 41/0007 |
| 2021/0115870 A1* | 4/2021 | Hashimoto | G06Q 30/018 |
| 2021/0115871 A1* | 4/2021 | Hashimoto | F02D 41/10 |
| 2021/0140779 A1* | 5/2021 | Uenoyama | G01C 21/3697 |
| 2021/0188276 A1* | 6/2021 | Hashimoto | G01C 21/3807 |
| 2021/0189990 A1* | 6/2021 | Hashimoto | F02D 41/2438 |
| 2021/0189991 A1* | 6/2021 | Hashimoto | G06Q 30/0224 |
| 2021/0190204 A1* | 6/2021 | Hashimoto | G06N 3/006 |
| 2021/0190522 A1* | 6/2021 | Hashimoto | G07C 5/0816 |
| 2021/0213963 A1* | 7/2021 | Hashimoto | G06N 20/00 |
| 2021/0213966 A1* | 7/2021 | Hashimoto | B60W 50/082 |
| 2021/0213975 A1* | 7/2021 | Hashimoto | B60W 10/06 |
| 2021/0217254 A1* | 7/2021 | Hashimoto | B60W 40/00 |
| 2021/0222640 A1* | 7/2021 | Hashimoto | F02D 41/2451 |
| 2021/0229687 A1* | 7/2021 | Hashimoto | G07C 5/0808 |
| 2021/0229688 A1* | 7/2021 | Hashimoto | B60W 50/06 |
| 2021/0229689 A1* | 7/2021 | Hashimoto | B60W 50/06 |
| 2021/0231070 A1* | 7/2021 | Hashimoto | F02D 41/2422 |
| 2021/0237773 A1* | 8/2021 | Hashimoto | G06N 20/00 |
| 2021/0239060 A1* | 8/2021 | Hashimoto | F02D 41/1402 |
| 2021/0253086 A1* | 8/2021 | Hashimoto | B60W 20/20 |
| 2021/0254571 A1* | 8/2021 | Hashimoto | G06N 20/00 |
| 2021/0334838 A1* | 10/2021 | Okazaki | G06Q 30/0215 |
| 2021/0339752 A1* | 11/2021 | Uenoyama | H04W 4/46 |
| 2021/0357913 A1* | 11/2021 | Tanaka | G06Q 30/30 |
| 2021/0366041 A1* | 11/2021 | Yuza | G07C 5/008 |
| 2021/0366042 A1* | 11/2021 | Yuza | G06Q 50/00 |
| 2021/0383420 A1* | 12/2021 | Tanaka | G06Q 20/36 |
| 2021/0403000 A1* | 12/2021 | Bunazawa | B60K 6/445 |
| 2021/0403014 A1* | 12/2021 | Bunazawa | B60K 6/445 |
| 2022/0018433 A1* | 1/2022 | Bunazawa | F16H 61/30 |
| 2022/0034398 A1* | 2/2022 | Fujii | F16H 61/061 |
| 2022/0101209 A1* | 3/2022 | Okabe | G06Q 10/02 |
| 2022/0101364 A1* | 3/2022 | Sakurada | G06Q 30/0224 |
| 2022/0143823 A1* | 5/2022 | Yoshida | G06N 3/088 |
| 2022/0147919 A1* | 5/2022 | Kanata | G06Q 10/0832 |
| 2022/0176977 A1* | 6/2022 | Ding | G06N 7/005 |
| 2022/0181876 A1* | 6/2022 | Shiraiwa | A63B 22/02 |
| 2022/0185318 A1* | 6/2022 | Ehara | B60W 40/09 |
| 2022/0198760 A1* | 6/2022 | Serizawa | A63F 13/65 |
| 2022/0215309 A1* | 7/2022 | Nakashima | G06Q 10/06311 |
| 2022/0224112 A1* | 7/2022 | Ehara | H02J 3/14 |

FOREIGN PATENT DOCUMENTS

| | | | | |
|---|---|---|---|---|
| AU | 2020256407 A1 | * | 5/2021 | ............ B60K 7/0007 |
| AU | 2020286176 A1 | * | 8/2021 | ............ B60K 26/02 |
| AU | 2020256407 B2 | * | 3/2022 | ............ B60K 7/0007 |
| BR | 102020020775 A2 | * | 7/2021 | ............ B60K 7/0007 |
| CA | 3096152 A1 | * | 4/2021 | ............ B60K 7/0007 |
| CA | 3096160 A1 | * | 4/2021 | ......... F02D 41/0215 |
| CA | 3096267 A1 | * | 4/2021 | ......... B60W 50/0098 |
| CN | 108154283 A | * | 6/2018 | ....... G06Q 10/06393 |
| CN | 108256766 A | * | 7/2018 | |
| CN | 109624986 A | * | 4/2019 | ............ B60W 30/143 |
| CN | 109693659 A | * | 4/2019 | ............... B60L 1/00 |
| CN | 109823345 A | * | 5/2019 | |
| CN | 109969033 A | * | 7/2019 | ............. B60L 53/65 |
| CN | 110009772 A | * | 7/2019 | ............. B60R 25/24 |
| CN | 110033214 A | * | 7/2019 | ............ G06Q 10/083 |
| CN | 110084659 A | * | 8/2019 | ............ G06Q 20/127 |
| CN | 110462697 A | * | 11/2019 | ............ B60W 40/09 |
| CN | 110663073 A | * | 1/2020 | ............ B60W 30/10 |
| CN | 110689365 A | * | 1/2020 | ............ G01C 21/3438 |
| CN | 110717803 A | * | 1/2020 | ............ G01C 21/3415 |
| CN | 110738749 A | * | 1/2020 | ............... E04G 3/24 |
| CN | 110920631 A | * | 3/2020 | ............ B60W 50/00 |
| CN | 110942333 A | * | 3/2020 | ............ G06F 16/235 |
| CN | 108995654 B | * | 4/2020 | ............ B60W 40/09 |
| CN | 108995655 B | * | 4/2020 | ............ B60W 40/09 |
| CN | 110949397 A | * | 4/2020 | |
| CN | 111102043 A | * | 5/2020 | ............ B60W 10/06 |
| CN | 111144684 A | * | 5/2020 | ............ G06Q 10/02 |
| CN | 111222630 A | * | 6/2020 | |

(56) References Cited

FOREIGN PATENT DOCUMENTS

| | | | | |
|---|---|---|---|---|
| CN | 111325973 A | * | 6/2020 | ............ B60L 53/665 |
| CN | 111340234 A | * | 6/2020 | |
| CN | 107179870 B | * | 7/2020 | ......... B60R 16/0373 |
| CN | 108162979 B | * | 9/2020 | ................. A61B 5/18 |
| CN | 111626654 A | * | 9/2020 | ............ B60L 53/305 |
| CN | 111837083 A | * | 10/2020 | ............. G01S 17/89 |
| CN | 111985661 A | * | 11/2020 | ........... B60H 3/0085 |
| CN | 112112713 A | * | 12/2020 | .............. B01D 53/02 |
| CN | 112124310 A | * | 12/2020 | ...... B60W 30/18163 |
| CN | 110667565 B | * | 1/2021 | ............. B60W 10/06 |
| CN | 112201069 A | * | 1/2021 | ............ G06N 3/0454 |
| CN | 112396199 A | * | 2/2021 | ............ G05D 1/0212 |
| CN | 112396487 A | * | 2/2021 | ......... G01C 21/3438 |
| CN | 112412580 A | * | 2/2021 | .............. B01D 53/62 |
| CN | 112446760 A | * | 3/2021 | ......... B60W 60/0025 |
| CN | 112488307 A | * | 3/2021 | ............. G06N 20/00 |
| CN | 112561748 A | * | 3/2021 | ....... G06Q 10/06313 |
| CN | 112677984 A | * | 4/2021 | ............. B60W 20/16 |
| CN | 112682181 A | * | 4/2021 | ......... F02D 41/0215 |
| CN | 112682182 A | * | 4/2021 | ............. B60W 10/06 |
| CN | 112682184 A | * | 4/2021 | ......... F02D 41/0002 |
| CN | 112682196 A | * | 4/2021 | ............. B60W 20/16 |
| CN | 112682197 A | * | 4/2021 | ............. B60W 10/06 |
| CN | 112682198 A | * | 4/2021 | ......... B60W 50/0098 |
| CN | 112682200 A | * | 4/2021 | ............. F01N 3/021 |
| CN | 112682202 A | * | 4/2021 | ......... B60W 50/045 |
| CN | 112682203 A | * | 4/2021 | ............. B60W 10/06 |
| CN | 112682204 A | * | 4/2021 | ............. B60W 10/06 |
| CN | 112686489 A | * | 4/2021 | ......... G01C 21/3697 |
| CN | 112734319 A | * | 4/2021 | ................ B60P 3/00 |
| CN | 112781608 A | * | 5/2021 | ......... G01C 21/3484 |
| CN | 112896170 A | * | 6/2021 | ............. B60W 40/00 |
| CN | 112918477 A | * | 6/2021 | |
| CN | 112977461 A | * | 6/2021 | ........ B60W 50/0098 |
| CN | 113006951 A | * | 6/2021 | ...... B60W 30/18163 |
| CN | 113007339 A | * | 6/2021 | ...... B60W 30/18163 |
| CN | 113090400 A | * | 7/2021 | ............ F02B 77/084 |
| CN | 113090404 A | * | 7/2021 | ............. F02D 29/02 |
| CN | 113095616 A | * | 7/2021 | ......... G01C 21/3469 |
| CN | 113103971 A | * | 7/2021 | ............. B60W 50/00 |
| CN | 113103972 A | * | 7/2021 | ........ B60W 60/0051 |
| CN | 113107685 A | * | 7/2021 | ............. B60W 40/12 |
| CN | 113153550 A | * | 7/2021 | ............. F02D 41/10 |
| CN | 113175385 A | * | 7/2021 | ............ F02D 11/105 |
| CN | 113176739 A | * | 7/2021 | ............. G07C 5/008 |
| CN | 113187612 A | * | 7/2021 | .......... B60W 50/045 |
| CN | 113187613 A | * | 7/2021 | ............. B60K 26/02 |
| CN | 113217204 A | * | 8/2021 | .......... B60W 50/045 |
| CN | 113217205 A | * | 8/2021 | ......... F02D 41/1402 |
| CN | 113253739 A | * | 8/2021 | |
| CN | 113264034 A | * | 8/2021 | ............ B60W 20/20 |
| CN | 113266479 A | * | 8/2021 | ............ B60W 10/02 |
| CN | 113266481 A | * | 8/2021 | ............ B60W 50/06 |
| CN | 113268879 A | * | 8/2021 | |
| CN | 113269963 A | * | 8/2021 | |
| CN | 112201069 B | * | 10/2021 | ........... G06N 3/0454 |
| CN | 113253739 B | * | 11/2021 | |
| CN | 112124310 B | * | 12/2021 | ...... B60W 30/18163 |
| CN | 113269963 B | * | 12/2021 | |
| CN | 113753026 A | * | 12/2021 | |
| CN | 113954837 A | * | 1/2022 | |
| CN | 114067557 A | * | 2/2022 | |
| CN | 114117944 A | * | 3/2022 | |
| CN | 114187567 A | * | 3/2022 | |
| CN | 114117944 B | * | 4/2022 | |
| CN | 114407931 A | * | 4/2022 | |
| EP | 2055584 A2 | * | 5/2009 | ............... B60K 6/26 |
| EP | 2055584 B1 | * | 5/2013 | ............... B60K 6/26 |
| EP | 3809340 A1 | * | 4/2021 | ............ B60K 7/0007 |
| ES | 2 286 958 A1 | | 12/2007 | |
| JP | 04-293626 A | | 10/1992 | |
| JP | 6-248997 A | | 9/1994 | |
| JP | 10-254505 A | | 9/1998 | |
| JP | 2000-250604 A | | 9/2000 | |
| JP | 2004-257434 A | | 9/2004 | |
| JP | 2009-019523 A | | 1/2009 | |
| JP | 2009-167968 A | | 7/2009 | |
| JP | 2016-006327 A | | 1/2016 | |
| JP | 2016-169686 A | | 9/2016 | |
| JP | 6012851 B2 | * | 10/2016 | ............ B60W 40/09 |
| JP | 2019-519851 A | | 7/2019 | |
| JP | 6547991 B1 | | 7/2019 | |
| JP | 6547992 B1 | | 7/2019 | |
| JP | 2019-144748 A | | 8/2019 | |
| JP | 6590097 B1 | | 9/2019 | |
| JP | 6705544 B1 | * | 6/2020 | ......... F02D 41/0002 |
| JP | 6744597 B1 | * | 8/2020 | ............. B60W 10/06 |
| JP | 2020148593 A | * | 9/2020 | .............. B25J 9/163 |
| JP | 2021066240 A | * | 4/2021 | ......... F02D 41/0002 |
| JP | 2021066417 A | * | 4/2021 | |
| JP | 2021066418 A | * | 4/2021 | ............ B60K 7/0007 |
| JP | 2021067191 A | * | 4/2021 | ............. B60W 20/16 |
| JP | 2021067192 A | * | 4/2021 | ............. B60W 10/06 |
| JP | 2021067193 A | * | 4/2021 | ......... F02D 41/0215 |
| JP | 2021067194 A | * | 4/2021 | ........ B60W 50/0098 |
| JP | 2021067195 A | * | 4/2021 | .......... B60W 50/045 |
| JP | 2021067196 A | * | 4/2021 | ............. F01N 3/021 |
| JP | 2021067197 A | * | 4/2021 | ............. B60W 10/06 |
| JP | 2021067201 A | * | 4/2021 | ............. B60W 10/06 |
| JP | 2021067255 A | * | 4/2021 | |
| JP | 2021067256 A | * | 4/2021 | |
| JP | 2021067257 A | * | 4/2021 | |
| JP | 2021067258 A | * | 4/2021 | |
| JP | 2021067259 A | * | 4/2021 | ............. B60W 10/06 |
| JP | 2021067260 A | * | 4/2021 | ............ B60K 7/0007 |
| JP | 2021067261 A | * | 4/2021 | |
| JP | 2021067262 A | * | 4/2021 | |
| JP | 6908144 B1 | | 7/2021 | |
| JP | 2021099058 A | * | 7/2021 | ............. B60W 20/16 |
| JP | 2021099059 A | * | 7/2021 | ............. B60W 10/06 |
| JP | 2021099060 A | * | 7/2021 | ............. F02D 29/02 |
| JP | 2021099061 A | * | 7/2021 | ............ F02B 77/084 |
| JP | 2021099112 A | * | 7/2021 | ...... B60W 30/18163 |
| JP | 2021099665 A | * | 7/2021 | ......... G01C 21/3469 |
| JP | 2021105343 A | * | 7/2021 | ...... B60W 30/18163 |
| JP | 2021109508 A | * | 8/2021 | ............. G07C 5/008 |
| JP | 2021110276 A | * | 8/2021 | ........ B60W 60/0051 |
| JP | 2021110277 A | * | 8/2021 | ............. B60W 50/00 |
| JP | 2021110278 A | * | 8/2021 | ............. B60W 40/12 |
| JP | 2021115875 A | * | 8/2021 | ............. F02D 41/10 |
| JP | 2021116740 A | * | 8/2021 | ............ F02D 11/105 |
| JP | 2021116782 A | * | 8/2021 | ............. B60K 26/02 |
| JP | 2021116783 A | * | 8/2021 | .......... B60W 50/045 |
| JP | 2021124044 A | * | 8/2021 | .......... B60W 50/045 |
| JP | 2021124055 A | * | 8/2021 | ......... F02D 41/1402 |
| JP | 2021124403 A | * | 8/2021 | |
| JP | 2021127070 A | * | 9/2021 | ............. B60W 20/20 |
| JP | 2021127753 A | * | 9/2021 | ............. B60W 10/02 |
| JP | 6988969 B1 | * | 1/2022 | |
| JP | 6997149 B2 | | 1/2022 | |
| JP | 2022048416 A | * | 3/2022 | |
| JP | 2022054982 A | * | 4/2022 | ............ G07C 5/0833 |
| TW | 202117179 A | * | 5/2021 | ............ B60K 7/0007 |
| TW | 202117180 A | * | 5/2021 | ......... F02D 41/0215 |
| TW | 202118318 A | * | 5/2021 | ........ B60W 50/0098 |
| TW | 202128467 A | * | 8/2021 | ............. B60K 26/02 |
| WO | WO-2013057811 A | * | 4/2013 | ............. G06Q 30/02 |
| WO | WO-2014157401 A1 | * | 10/2014 | ............ B60W 40/09 |
| WO | WO 2018/084324 A1 | | 5/2018 | |
| WO | WO 2018/105703 A1 | | 6/2018 | |
| WO | WO-2020183864 A1 | * | 9/2020 | .............. B25J 9/163 |
| WO | WO-2021103841 A1 | * | 6/2021 | ............. B60W 50/00 |
| WO | WO-2021157212 A1 | * | 8/2021 | |
| WO | WO-2022059484 A1 | * | 3/2022 | |

OTHER PUBLICATIONS

Notice of Allowance dated Feb. 16, 2022 in co-pending U.S. Appl. No. 17/066,862, 8 pages.

Corrected Notice of Allowability issued in U.S. Appl. No. 17/063,203 dated Jan. 20, 2022 (6 pages).

Office Action issued in corresponding U.S. Appl. No. 17/063,203 dated Jul. 19, 2021 (8 pages).

(56) References Cited

OTHER PUBLICATIONS

Office Action issued in corresponding U.S. Appl. No. 17/066,862 dated Jun. 24, 2021 (7 pages).
Notice of Allowance dated Oct. 19, 2021 in co-pending U.S. Appl. No. 17/063,203, 8 pages.
Office Action dated Sep. 28, 2022, issued in corresponding U.S. Appl. No. 16/950,242.
Notice of Allowance issued to U.S. Appl. No. 17/136,220 dated Mar. 7, 2023.
Notice of Allowance issued to U.S. Appl. No. 17/128,822 dated Mar. 22, 2023.

* cited by examiner

METHOD OF GENERATING VEHICLE CONTROL DATA, VEHICLE CONTROL DEVICE, AND VEHICLE CONTROL SYSTEM

INCORPORATION BY REFERENCE

The disclosure of Japanese Patent Application No. 2019-191093 filed on Oct. 18, 2019 including the specification, drawings and abstract is incorporated herein by reference in its entirety.

BACKGROUND

1. Technical Field

The present disclosure relates to a method of generating vehicle control data, a vehicle control device, and a vehicle control system.

2. Description of Related Art

For example, Japanese Unexamined Patent Application Publication No. 2016-6327 (JP 2016-6327 A) describes a control device that operates a throttle valve as an operating unit of an internal combustion engine mounted in a vehicle based on a value obtained through filter processing on an operation amount of an accelerator pedal.

SUMMARY

Incidentally, since the filter needs to set an opening degree of the throttle valve of the internal combustion engine mounted in the vehicle to an appropriate opening degree according to the operation amount of the accelerator pedal, there is a need for an expert to apply many man-hours for adaptation. In this way, hitherto, an expert has applied many man-hours for adaptation of an operation amount or the like of electronic equipment in a vehicle according to a state of the vehicle.

A first aspect of the disclosure relates to a method of generating vehicle control data. The method is applied to a vehicle configured to select one of a plurality of traveling control modes and is executed by a processor in a state in which a relationship definition data defining a relationship between a state of the vehicle and an action variable as a variable relating to an operation of electronic equipment in the vehicle is stored in a memory. The method includes operation processing for operating the electronic equipment, acquisition processing for acquiring a detection value of a sensor configured to detect a state of the vehicle, reward calculation processing for providing, based on the detection value acquired through the acquisition processing, a greater reward when a characteristic of the vehicle having correlation with the traveling control mode satisfies a criterion than when the characteristic of the vehicle does not satisfy the criterion, and update processing for updating the relationship definition data with the state of the vehicle, a value of the action variable used for the operation of the electronic equipment, and the reward corresponding to the operation based on the detection value acquired through the acquisition processing as inputs to update mapping determined in advance. The processor is configured to, based on the update mapping, output the relationship definition data updated to increase an expected return on the reward when the electronic equipment is operated in compliance with the relationship definition data. The reward calculation processing includes processing for providing a reward such that the reward provided when the selected traveling control mode is a first traveling control mode is different from the reward provided when the selected traveling control mode is a second traveling control mode even though the characteristic of the vehicle satisfies the same criterion, the first traveling control mode being different from the second traveling control mode.

In the above-described method, the reward accompanied by the operation of the electronic equipment is calculated, whereby it is possible to ascertain what kind of reward is obtained by the operation. Then, the relationship definition data is updated based on the reward through update mapping compliant with reinforcement learning, whereby it is possible to set the relationship between the state of the vehicle and the action variable. Accordingly, in setting the relationship between the state of the vehicle and the action variable, it is possible to reduce man-hours requested to the expert.

Incidentally, in the vehicle configured to select one of the traveling control modes, the value of the action variable appropriate for the state of the vehicle may be different for each traveling control mode. Accordingly, in the above-described method, the different rewards are provided even though the characteristic of the vehicle satisfies the same criterion between the first traveling control mode and the second traveling control mode, whereby the value of the action variable appropriate for the state of the vehicle can be learned through the reinforcement learning for each traveling control mode.

In the above-described aspect, a change in accelerator operation amount may be included in the state of the vehicle. The reward calculation processing may include processing for providing a greater reward when a front-rear direction acceleration of the vehicle accompanied by the change in accelerator operation amount satisfies a criterion than when the acceleration does not satisfy the criterion, and providing different rewards between the first traveling control mode and the second traveling control mode among the traveling control modes even though the acceleration satisfies the same criterion.

Since the magnitude of the front-rear direction acceleration of the vehicle resulting from the change in accelerator operation amount has a lot to do with the traveling control mode of the vehicle, as in the above-described method, the different rewards are provided according to the traveling control mode even though the acceleration satisfies the same criterion, whereby the value of the action variable appropriate for an accelerator operation can be learned through the reinforcement learning for each traveling control mode.

In the above-described aspect, the vehicle may include an internal combustion engine as a thrust generation device. A throttle valve of the internal combustion engine may be included in the electronic equipment. A variable relating to an opening degree of the throttle valve may be included in the action variable.

For example, in an internal combustion engine in which an injection amount is adjusted according to an intake air amount, or the like, torque or an output of the internal combustion engine is changed according to the opening degree of the throttle valve. For this reason, the variable relating to the opening degree of the throttle valve is used as the action variable for the accelerator operation amount, whereby it is possible to suitably adjust propulsion force of the vehicle.

In the above-described aspect, an ignition device of the internal combustion engine may be included in the electronic equipment. A variable relating to an ignition timing may be included in the action variable. In the internal combustion engine including the ignition device, it is possible to adjust torque of the internal combustion engine according to the ignition timing operated by the ignition device. For this reason, in the above-described method, the variable relating to the ignition timing is included in the action variable, whereby it is possible to suitably adjust propulsion force of the vehicle according to the change in accelerator operation amount.

In the above-described aspect, the relationship definition data may be data that defines a relationship between time-series data of the accelerator operation amount and the action variable.

In the above-described method, the relationship between the time-series data of the accelerator operation amount and the action variable is defined, whereby it is possible to finely adjust the value of the action variable according to various changes in accelerator operation amount, for example, compared to when the relationship between one-dimensional data indicating a change amount of the accelerator operation amount and the action variable is defined.

In the above-described aspect, the processor may be configured to execute processing for generating control mapping data by associating the state of the vehicle with the value of the action variable maximizing the expected return based on the relationship definition data updated through the update processing on a one-to-one basis. The control mapping data may include the value of the action variable maximizing the state of the vehicle as an input and the expected return as an output.

In the above-described method, the control mapping data is generated based on the relationship definition data learned through the reinforcement learning. For this reason, the control mapping data is mounted in a control device, whereby it is possible to easily set the value of the action variable maximizing the expected return based on the state of the vehicle.

A second aspect of the disclosure relates to a vehicle control device. The vehicle control device that is applied to a vehicle configured to select one of a plurality of traveling control modes. The vehicle control device includes a memory and a processor mounted in the vehicle. The processor is configured to execute operation processing for operating electronic equipment, acquisition processing for acquiring a detection value of a sensor configured to detect a state of the vehicle, reward calculation processing for providing, based on the detection value acquired through the acquisition processing, a greater reward when a characteristic of the vehicle having correlation with the traveling control modes satisfies a criterion than when the characteristic of the vehicle does not satisfy the criterion and update processing for updating relationship definition data with the state of the vehicle, a value of an action variable used for the operation of the electronic equipment, and the reward corresponding to the operation based on the detection value acquired through the acquisition processing as inputs to update mapping determined in advance. The processor is configured to, based on the update mapping, output the relationship definition data updated to increase an expected return on the reward when the electronic equipment is operated in compliance with the relationship definition data and the reward calculation processing includes processing for providing a reward such that the reward provided when the selected traveling control mode is a first traveling control mode is different from the reward provided when the selected traveling control mode is a second traveling control mode even though the characteristic of the vehicle satisfies the same criterion, the first traveling control mode being different from the second traveling control mode.

In the above-described aspect, the operation processing may include processing for operating the electronic equipment based on the relationship definition data in compliance with the value of the action variable according to the state of the vehicle. The acquisition processing may include processing for acquiring a selection result regarding which of the traveling control modes is selected by a user.

In the above-described configuration, the value of the action variable is set based on the relationship definition data learned through the reinforcement learning, and the electronic equipment is operated based on the value of the action variable, whereby it is possible to operate the electronic equipment so as to increase the expected return. Besides, the selection result of the traveling control mode of the user is acquired, whereby it is possible to update the relationship definition data for each traveling control mode with traveling of the vehicle.

A third aspect of the disclosure relates to a vehicle control system. The vehicle control system that is applied to a vehicle configured to select one of a plurality of traveling control modes. The vehicle control system includes a memory and a processor mounted in the vehicle. The processor is configured to execute operation processing for operating electronic equipment, acquisition processing for acquiring a detection value of a sensor configured to detect a state of the vehicle, reward calculation processing for providing, based on the detection value acquired through the acquisition processing, a greater reward when a characteristic of the vehicle having correlation with the traveling control modes satisfies a criterion than when the characteristic of the vehicle does not satisfy the criterion and update processing for updating relationship definition data with the state of the vehicle, a value of an action variable used for the operation of the electronic equipment, and the reward corresponding to the operation based on the detection value acquired through the acquisition processing as inputs to update mapping determined in advance. The processor is configured to, based on the update mapping, output the relationship definition data updated to increase an expected return on the reward when the electronic equipment is operated in compliance with the relationship definition data and the reward calculation processing includes processing for providing a reward such that the reward provided when the selected traveling control mode is a first traveling control mode is different from the reward provided when the selected traveling control mode is a second traveling control mode even though the characteristic of the vehicle satisfies the same criterion, the first traveling control mode being different from the second traveling control mode.

In the above-described aspect, the processor may include a first processor mounted in a vehicle, and a second processor different from an in-vehicle device. The first processor may be configured to execute at least the acquisition processing and the operation processing. The second processor may be configured to execute at least the update processing.

In the above-described configuration, the update processing is executed by the second processor, whereby it is possible to reduce a calculation load of the first processor compared to when the first processor executes the update processing. The second processor being different from the in-vehicle device means that the second processor is not the in-vehicle device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
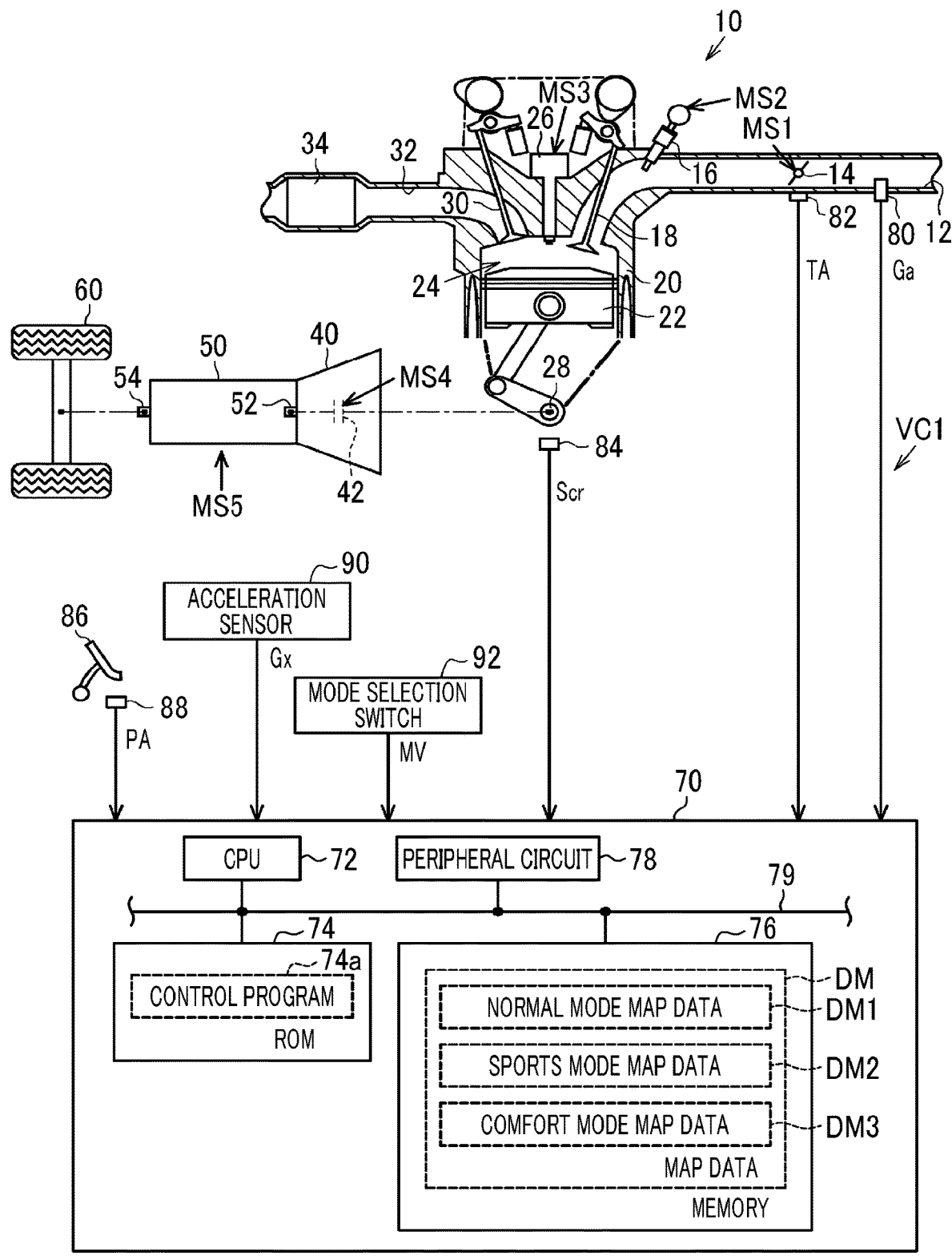
FIG. 1 is a diagram showing a control device and a drive system according to a first embodiment.

Hereinafter, embodiments of a method of generating vehicle control data, a vehicle control device, a vehicle control system, and a vehicle learning device will be described referring to the drawings.

First Embodiment

FIG. 1 shows the configuration of a drive system and a control device of a vehicle VC1 according to the embodiment.

As shown in FIG. 1, in an intake passage 12 of an internal combustion engine 10, a throttle valve 14 and a fuel injection valve 16 are provided in order from an upstream side, and air sucked into the intake passage 12 or fuel injected from the fuel injection valve 16 flows into a combustion chamber 24 partitioned by a cylinder 20 and a piston 22 when an intake valve 18 is opened. In the combustion chamber 24, an air-fuel mixture of fuel and air is supplied for combustion with spark discharge of an ignition device 26, and energy generated by combustion is converted into rotational energy of a crankshaft 28 through the piston 22. The air-fuel mixture supplied for combustion is discharged as exhaust gas to an exhaust passage 32 when an exhaust valve 30 is opened. In the exhaust passage 32, a catalyst 34 as a post-processing device that removes exhaust gas is provided.

An input shaft 52 of a transmission 50 can be mechanically coupled to the crankshaft 28 through a torque converter 40 including a lockup clutch 42. The transmission 50 is a device that varies a gear ratio as a ratio of a rotation speed of the input shaft 52 and a rotation speed of an output shaft 54. Drive wheels 60 are mechanically coupled to the output shaft 54.

A control device 70 adapts the internal combustion engine 10 as a control target and operates an operating unit of the internal combustion engine 10, such as the throttle valve 14, the fuel injection valve 16, or the ignition device 26, to control torque, an exhaust gas component ratio, or the like that is a control amount of the internal combustion engine.

The control device 70 also adapts the torque converter 40 as a control target and operates the lockup clutch 42 to control an engagement state of the lockup clutch 42. The control device 70 also adapts the transmission 50 as a control target and operates the transmission 50 to control the gear ratio as a control amount of the transmission. In FIG. 1, respective operation signals MS1 to MS5 of the throttle valve 14, the fuel injection valve 16, the ignition device 26, the lockup clutch 42, and the transmission 50 are described.

The control device 70 refers to an intake air amount Ga detected by an air flowmeter 80, an opening degree (throttle valve opening degree TA) of the throttle valve 14 detected by a throttle sensor 82, and an output signal Scr of a crank angle sensor 84 to control the control amount. The control device 70 refers to a depression amount (accelerator operation amount PA) of an accelerator pedal 86 detected by an accelerator sensor 88, a front-rear direction acceleration Gx of the vehicle VC1 detected by an acceleration sensor 90, and a value of a mode variable MV determined by an operation of a mode selection switch 92. Here, the mode selection switch 92 is a human-machine interface that allows a user of the vehicle VC1 to select one of three options relating to a traveling control mode of the vehicle VC1. Here, the three traveling control modes are a sports mode, a normal mode, and a comfort mode, and are modes that have different response performance of the vehicle VC1 for a driving operation of the user. That is, the response performance of the sports mode is the highest, and the response performance of the comfort mode is the lowest. The comfort mode is a mode where an acceleration that a fellow passenger feels is suppressed during driving of the vehicle VC1.

The control device 70 includes a CPU 72, a ROM 74, an electrically rewritable nonvolatile memory (memory 76), and a peripheral circuit 78, and the units are communicable through a local network 79. Here, the peripheral circuit 78 includes a circuit that generates a clock signal for defining an internal operation, a power supply circuit, a reset circuit, and the like.

The ROM 74 stores a control program 74a. On the other hand, the memory 76 stores map data DM including data having a command value (throttle valve opening degree command value TA*) of the throttle valve opening degree TA as an output variable and data having a retardation amount aop of an ignition device 26 as an output variable while having the accelerator operation amount PA as an input variable. Here, the retardation amount aop is a retardation amount with respect to a reference ignition timing determined in advance, and the reference ignition timing is a timing on a retardation side out of an MBT ignition timing and a knock limit point. The MBT ignition timing is an ignition timing (maximum torque ignition timing) at which maximum torque is obtained. The knock limit point is an advancement limit value of an ignition timing at which knocking can be restrained within an allowable level under assumed best conditions when high-octane-number fuel having a high knock limit is used.

The map data is set data of a discrete value of the input variable and a value of the output variable corresponding to each value of the input variable. In the embodiment, normal mode map data DM1, sports mode map data DM2, and comfort mode map data DM3 are provided as the map data DM.

Figure 2:
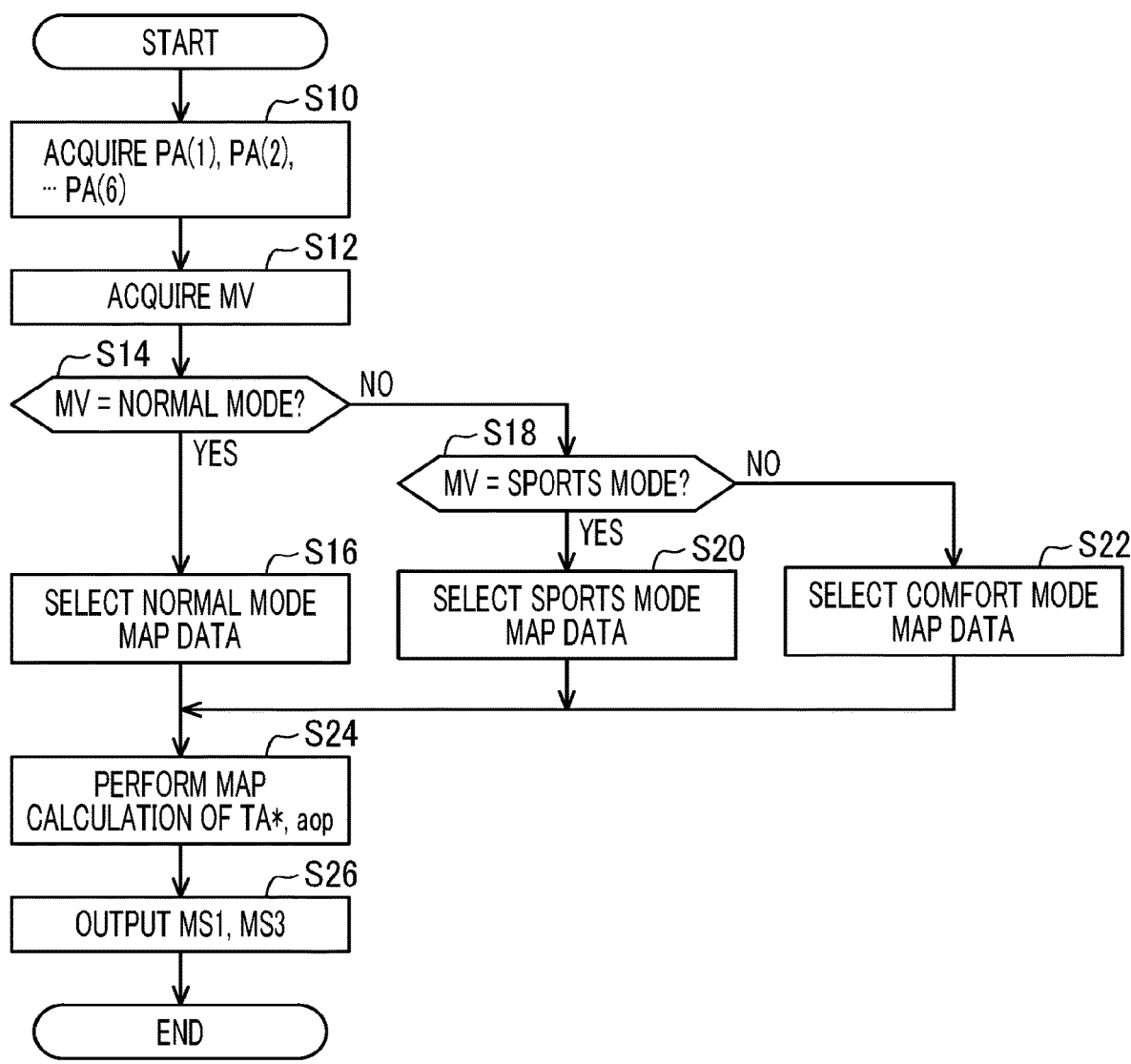
FIG. 2 is a flowchart showing a procedure of processing that is executed by a control device according to the first embodiment.

FIG. 2 shows a procedure of processing that is executed by the control device 70 according to the embodiment. The processing shown in FIG. 2 is implemented by the CPU 72 repeatedly executing the control program 74a stored in the ROM 74, for example, in a predetermined cycle. In the following description, the step number of the respective processing is represented by a number in front of which the character "S" is given.

In a series of processing shown in FIG. 2, the CPU 72 first acquires time-series data including six sampling values "PA(1), PA(2), . . . PA(6)" of the accelerator operation amount PA (S10). Here, the sampling values constituting time-series data are sampled at different timings from one another. In the embodiment, time-series data is constituted of six sampling values adjacent to one another in time series when sampling is performed in a given sampling cycle.

Next, the CPU 72 acquires the mode variable MV (S12). Then, the CPU 72 determines whether or not a value of the acquired mode variable MV indicates the normal mode (S14). When determination is made that the value of the mode variable MV indicates the normal mode (S14: YES), the CPU 72 selects the normal mode map data DM1 as the map data DM for use in an operation of the throttle valve 14 or the ignition device 26 (S16). In contrast, when determination is made that the value of the mode variable MV does not indicate the normal mode (S14: NO), the CPU 72 determines whether or not the value of the mode variable MV indicates the sports mode (S18). Then, when determination is made that the value of the mode variable MV indicates the sports mode (S18: YES), the CPU 72 selects the sports mode map data DM2 as the map data DM for use in the operation of the throttle valve 14 or the ignition device 26 (S20). In contrast, when determination is made that the value of the mode variable MV does not indicate the sports mode (S18: NO), the CPU 72 selects the comfort mode map data DM3 as the map data DM for use in the operation of the throttle valve 14 or the ignition device 26 (S22).

When the processing of S16, S20, or S22 is completed, the CPU 72 performs map calculation of the throttle valve opening degree command value TA* and the retardation amount aop using data selected among the map data DM (S24). Here, the map calculation should be, for example, processing in which, when a value of an input variable coincides with any value of an input variable of map data, a value of an output variable of corresponding map data is set as a calculation result, and when the value of the input variable does not coincide with any value of the input variable of map data, a value obtained by interpolation of values of a plurality of output variables included in map data is set as a calculation result.

Then, the CPU 72 outputs the operation signal MS1 to the throttle valve 14 to operate the throttle valve opening degree TA and outputs the operation signal MS3 to the ignition device 26 to operate the ignition timing (S26). Here, in the embodiment, since feedback control of the throttle valve opening degree TA to the throttle valve opening degree command value TA* is illustrated, even though the throttle valve opening degree command value TA* is the same value, the operation signal MS1 may be different. For example, when known knocking control (KCS) or the like is performed, the ignition timing becomes a value resulting from feedback correction by the KCS on a value obtained by retarding the reference ignition timing by the retardation amount aop. Here, the reference ignition timing is set variably according to the rotation speed NE of the crankshaft 28 and the filling efficiency η by the CPU 72. The rotation speed NE is calculated based on the output signal Scr of the crank angle sensor 84 by the CPU 72. The filling efficiency η is calculated based on the rotation speed NE and the intake air amount Ga by the CPU 72.

Figure 3:
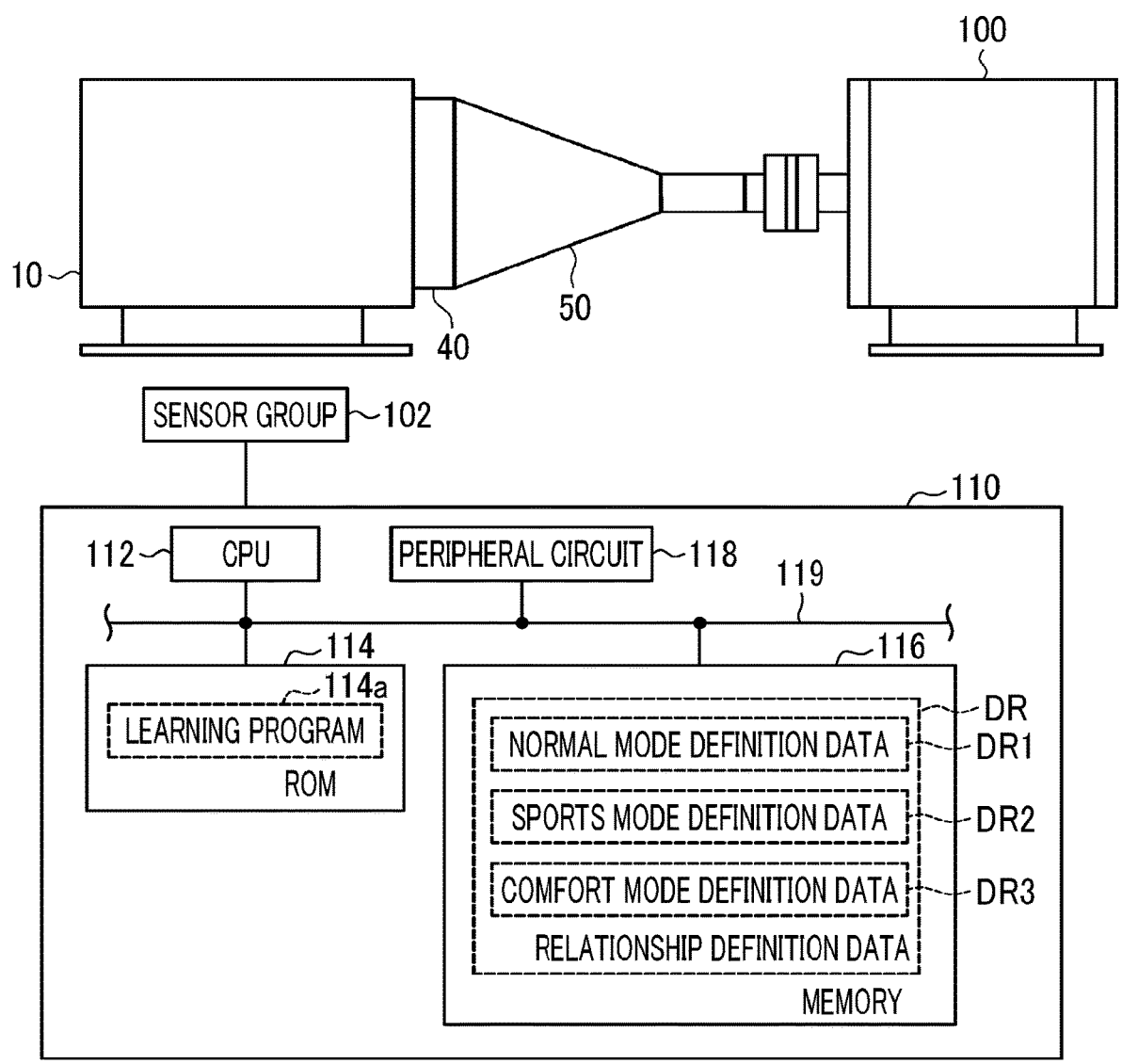
FIG. 3 is a diagram showing a system that generates map data according to the first embodiment.

When the processing of S26 is completed, the CPU 72 ends a series of processing shown in FIG. 2 once. FIG. 3 shows a system that generates the map data DM.

As shown in FIG. 3, in the embodiment, a dynamometer 100 is mechanically coupled to the crankshaft 28 of the internal combustion engine 10 through the torque converter 40 and the transmission 50. Then, various state variables in operating the internal combustion engine 10 are detected by a sensor group 102, and detection results are input to a generation device 110 as a computer that generates the map data DM. The sensors mounted in the vehicle VC1 shown in FIG. 1, and the like are included in the sensor group 102.

The generation device 110 includes a CPU 112, a ROM 114, an electrically rewritable nonvolatile memory (memory 116), and a peripheral circuit 118, and the units are communicable through a local network 119. Here, the memory 116 stores relationship definition data DR that defines the relationship between the accelerator operation amount PA, and the throttle valve opening degree command value TA* and the retardation amount aop. Here, the relationship definition data DR includes normal mode definition data DR1, sports mode definition data DR2, and comfort mode definition data DR3. The ROM 114 stores a learning program 114a that learns the relationship definition data DR through reinforcement learning.

Figure 4:
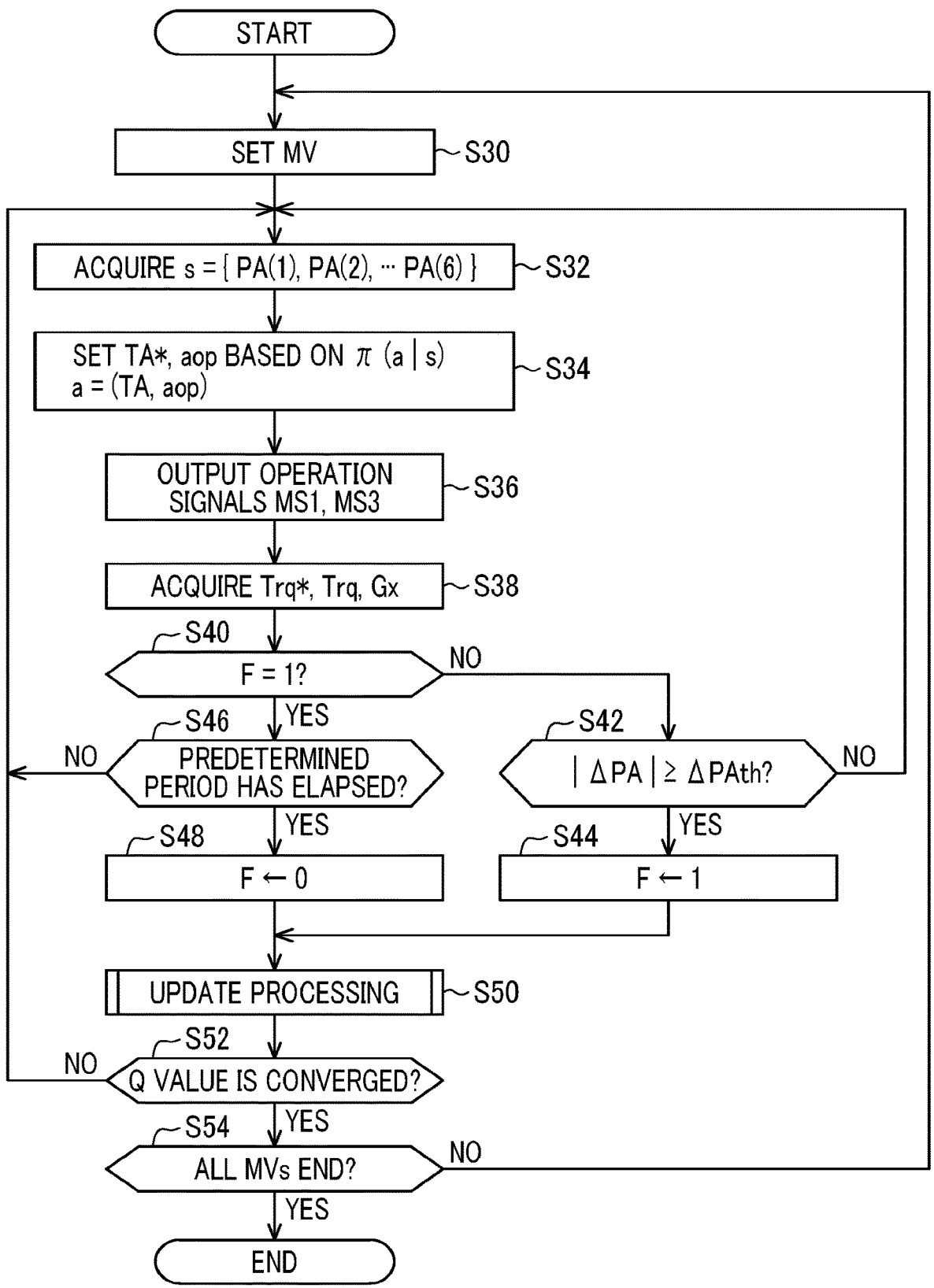
FIG. 4 is a flowchart showing a procedure of learning processing according to the first embodiment.

FIG. 4 shows a procedure of processing that is executed by the generation device 110. The processing shown in FIG. 4 is implemented by the CPU 112 executing the learning program 114a stored in the ROM 114.

In a series of processing shown in FIG. 4, the CPU 112 first sets the value of the mode variable MV (S30). Next, the CPU 112 acquires time-series data of the accelerator operation amount PA as a state s in a state in which the internal combustion engine 10 is operated (S32). The time-series data in this case is the same data as data in the processing of S10. Note that the accelerator pedal 86 is not present in the processing shown in FIG. 4. For this reason, it is assumed that the accelerator operation amount PA is generated in a pseudo manner by the generation device 110 simulating a state of the vehicle VC1, and the accelerator operation amount PA generated in a pseudo manner is regarded as a detection value of the state of the vehicle.

Next, the CPU 112 sets an action a including the throttle valve opening degree command value TA* and the retardation amount aop according to the state s acquired through the processing of S32 in compliance with a policy π determined by data corresponding to the value of the mode variable MV set through the processing of S30 in the relationship definition data DR (S34).

In the embodiment, the relationship definition data DR is data that determines an action value function Q and the policy π. In the embodiment, the action value function Q is a function in a table format indicating a value of an expected return according to eight-dimensional independent variables of the state s and the action a. The policy π determines a rule to preferentially select an action a (greedy action) maximizing the action value function Q with the independent variable to be the given state s with priority and also to select another action a with a predetermined probability ε when the state s is given.

In detail, in regard to the number of possible values of the independent variables of the action value function Q according to the embodiment, a part of all combinations of possible values of the state s and the action a is reduced by human knowledge or the like. That is, for example, determination is made that a situation in which one of adjacent two sampling values in the time-series data of the accelerator operation amount PA becomes a minimum value of the accelerator operation amount PA and the other sampling value becomes a maximum value does not result from a human operation on the accelerator pedal 86, and the action value function Q is not defined. In the embodiment, with the dimension reduction based on the human knowledge or the like, the possible values of the state s defining the action value function Q are limited to be equal to or less than the fourth power of 10, and more desirably, equal to or less than the third power of 10.

Next, the CPU 112 outputs the operation signals MS1, MS3 based on the set throttle valve opening degree command value TA* and retardation amount aop in the same manner as the processing of S26 (S36). Next, the CPU 112 acquires the torque Trq of the internal combustion engine 10, a torque command value Trq* to the internal combustion engine 10, and the acceleration Gx (S38). Here, the CPU 112 calculates the torque Trq based on load torque generated by the dynamometer 100 and a gear ratio of the transmission 50. The torque command value Trq* is set according to the accelerator operation amount PA. The CPU 112 calculates, based on the load torque of the dynamometer 100 and the like, the acceleration Gx as a value that is assumed to be generated in the vehicle when the internal combustion engine 10 and the like are mounted in the vehicle. That is, in the embodiment, although the acceleration Gx is a virtual value, the acceleration Gx is regarded as a detection value of the state of the vehicle.

Next, the CPU 112 determines whether or not a transition flag F is "1" (S40). When the transition flag F is "1", this indicates that the internal combustion engine is in a transition operation, and when the transition flag F is "0", this indicates that the internal combustion engine is not in the transition operation. When determination is made that the transition flag F is "0" (S40: NO), the CPU 112 determines whether or not an absolute value of a change amount ΔPA per unit time of the accelerator operation amount PA is equal to or greater than a predetermined amount ΔPAth (S42). Here, the change amount ΔPA should be set to, for example, the difference between the latest accelerator operation amount PA at an execution timing of the processing of S42 and the accelerator operation amount PA before the same timing by the unit time.

When determination is made that the absolute value of the change amount ΔPA is equal to or greater than the predetermined amount ΔPAth (S42: YES), the CPU 112 substitutes "1" into the transition flag F (S44), and when determination is made that the absolute value of the change amount ΔPA is less than the predetermined amount ΔPAth (S42: NO), the CPU 112 returns to the processing of S32.

In contrast, when determination is made that the transition flag F is "1" (S40: YES), the CPU 112 determines whether or not a predetermined period has elapsed after the processing of S44 is executed (S46). Here, the predetermined period is set to a period until a state in which the absolute value of the change amount ΔPA per unit time of the accelerator operation amount PA becomes equal to or less than a specified amount smaller than the predetermined amount ΔPAth is continued for a predetermined time. When determination is made that the predetermined period has elapsed (S46: YES), the CPU 112 substitutes "0" into the transition flag F (S48), and when determination is made that the predetermined period has not elapsed (S46: NO), the CPU 112 returns to the processing of S32.

Figure 5:
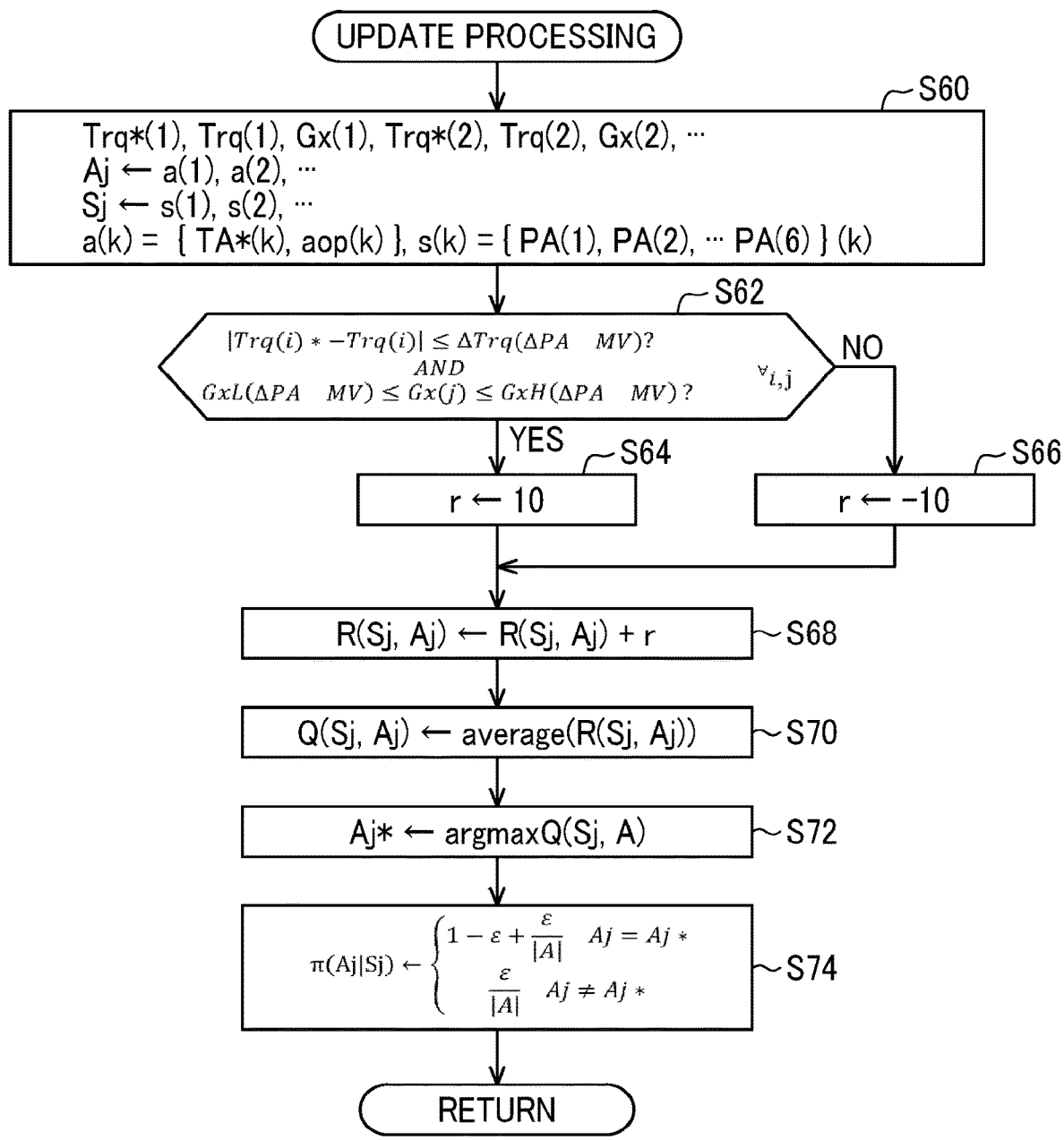
FIG. 5 is a flowchart showing details of a part of the learning processing according to the first embodiment.

When the processing of S44 or S48 is completed, the CPU 112 determines that one episode is ended, and updates the action value function Q through the reinforcement learning (S50). FIG. 5 shows the details of the processing of S50.

In a series of processing shown in FIG. 5, the CPU 112 acquires time-series data including a set of three sampling values of the torque command value Trq*, the torque Trq, and the acceleration Gx in the last ended episode and time-series data of the state s and the action a (S60). Here, the last episode is a period during which the transition flag F is continuously "1" when the processing of S60 is executed next to the processing of S48, and is a period during which the transition flag F is continuously "0" when the processing of S60 is executed next to the processing of S44.

FIG. 5 shows that different numbers in parentheses are values of variables at different sampling timings. For example, a torque command value Trq*(1) and a torque command value Trq*(2) are different in sampling timing from each other. Time-series data of the action a belonging to the last episode is defined as an action set Aj, and time-series data of the state s belonging to the same episode is defined as a state set Sj.

Next, the CPU 112 determines whether or not a logical product of a condition (A) that an absolute value of the difference between any torque Trq and the torque command value Trq* belonging to the last episode is equal to or less than a specified amount ΔTrq and a condition (B) that the acceleration Gx is equal to or greater than a lower limit value GxL and equal to or less than an upper limit value GxH is true (S62).

Here, the CPU 112 variably sets the specified amount ΔTrq with the change amount ΔPA per unit time of the accelerator operation amount PA and the value of the mode variable MV at the time of a start of an episode. That is, the CPU 112 sets the specified amount ΔTrq to a greater value when determination is made that an episode relates to a transition period based on the change amount ΔPA per unit time of the accelerator operation amount PA at the time of a start of an episode than when determination is made that an episode relates to a normal period. The CPU 112 minimizes the specified amount ΔTrq when the traveling control mode is the sports mode, and maximizes the specified amount ΔTrq when the traveling control mode is the comfort mode.

The CPU 112 variably sets the lower limit value GxL with the change amount ΔPA per unit time of the accelerator operation amount PA and the value of the mode variable MV at the time of the start of the episode. That is, when the episode relates to the transition period and the change amount ΔPA is positive, the CPU 112 sets the lower limit value GxL to a greater value than the episode in the normal period. When the episode relates to the transition period and the change amount ΔPA is negative, the CPU 112 sets the lower limit value GxL to a smaller value than the episode in the normal period. In a case where the change amount ΔPA is positive, the CPU 112 maximizes the lower limit value GxL when the traveling control mode is sports mode, and minimizes the lower limit value GxL when the traveling control mode is the comfort mode. In a case where the change amount ΔPA is negative, the CPU 112 minimizes the lower limit value GxL when the traveling control mode is the sports mode, and maximizes the lower limit value GxL when the traveling control mode is the comfort mode.

The CPU 112 variably sets the upper limit value GxH with the change amount ΔPA per unit time of the accelerator operation amount PA and the value of the mode variable MV at the time of the start of the episode. That is, when the episode relates to the transition period and the change amount ΔPA is positive, the CPU 112 sets the upper limit value GxH to a greater value than the episode in the normal period. When the episode relates to the transition period and the change amount ΔPA is negative, the CPU 112 sets the upper limit value GxH to a smaller value than the episode in the normal period. In a case where the change amount ΔPA is positive, the CPU 112 maximizes the upper limit value GxH when the traveling control mode is the sports mode, and minimizes the upper limit value GxH when the traveling control mode is the comfort mode. In a case where the change amount ΔPA is negative, the CPU 112 minimizes the upper limit value GxH when the traveling control mode is the sports mode, and maximizes the upper limit value GxH when the traveling control mode is the comfort mode.

When determination is made that the logical produce is true (S62: YES), the CPU 112 substitutes "1" into a reward r (S64), and when determination is made that the logical product is false (S62: NO), the CPU 112 substitutes "−10" into the reward r (S66). When the processing of S64 or S66 is completed, the CPU 112 updates data corresponding to the value of the mode variable MV set through the processing of S30 in the relationship definition data DR stored in the memory 116 shown in FIG. 3. In the embodiment, an e-soft on-policy type Monte Carlo method is used.

That is, the CPU 112 adds the reward r to each return R(Sj,Aj) determined by a set of each state read through the processing of S60 and a corresponding action (S68). Here, "R(Sj,Aj)" comprehensively represents a return R with one of the elements of the state set Sj as a state and one of the elements of the action set Aj as an action. Next, the return R(Sj,Aj) determined by the set of each state read through the processing of S60 and the corresponding action is averaged, and the averaged reward is substituted into the corresponding action value function Q(Sj,Aj) (S70). Here, averaging should be processing for dividing the return R calculated through the processing of S68 by the number of times in which the processing of S68 is executed. Note that an initial value of the return R should be zero.

Next, the CPU 112 substitutes, into an action Aj*, an action that is a set of the throttle valve opening degree command value TA* and the retardation amount aop when the corresponding action value function Q(Sj,A) has a maximum value on each state read through the processing of S60 (S72). Here, "A" indicates any possible action. Although the action Aj* becomes an individual value according to the type of the state read through the processing of S60, here, the action Aj* is simplified in expression and described by the same symbol.

Next, the CPU 112 updates a corresponding policy π*(Aj|Sj) on each state read through the processing of S60 (S74). That is, in a case where the total number of actions is "|A|", a selection probability of the action Aj* selected through S72 is "1-ε+ε/|A|". A selection probability of each of "|A|-1" actions other than the action Aj* is "ε/|A|". Since the processing of S74 is processing based on the action value function Q updated through the processing of S70, with this, the relationship definition data DR that defines the relationship between the state s and the action a is updated so as to increase the return R.

When the processing of S74 is completed, the CPU 112 ends a series of processing shown in FIG. 5 once. Returning to FIG. 4, in a case where the processing of S50 is completed, the CPU 112 determines whether or not the action value function Q is converged (S52). Here, determination should be made that the action value function Q is converged when the number of continuous times in which an update amount of the action value function Q through the processing of S50 becomes equal to or less than a predetermined value reaches a predetermined number of times. When determination is made that the action value function Q is not converged (S52: NO), the CPU 112 returns to the processing of S32. In contrast, when determination is made that the action value function Q is converged (S52: YES), the CPU 112 determines whether or not affirmative determination is made in the processing of S52 on all values of the mode variable MV (S54). Then, when determination is made that the value of the mode variable MV on which the action value function Q is not yet converged is present (S54: NO), the CPU 112 returns to the processing of S30 to perform learning of the action value function Q corresponding to the value of the mode variable MV.

Figure 6:
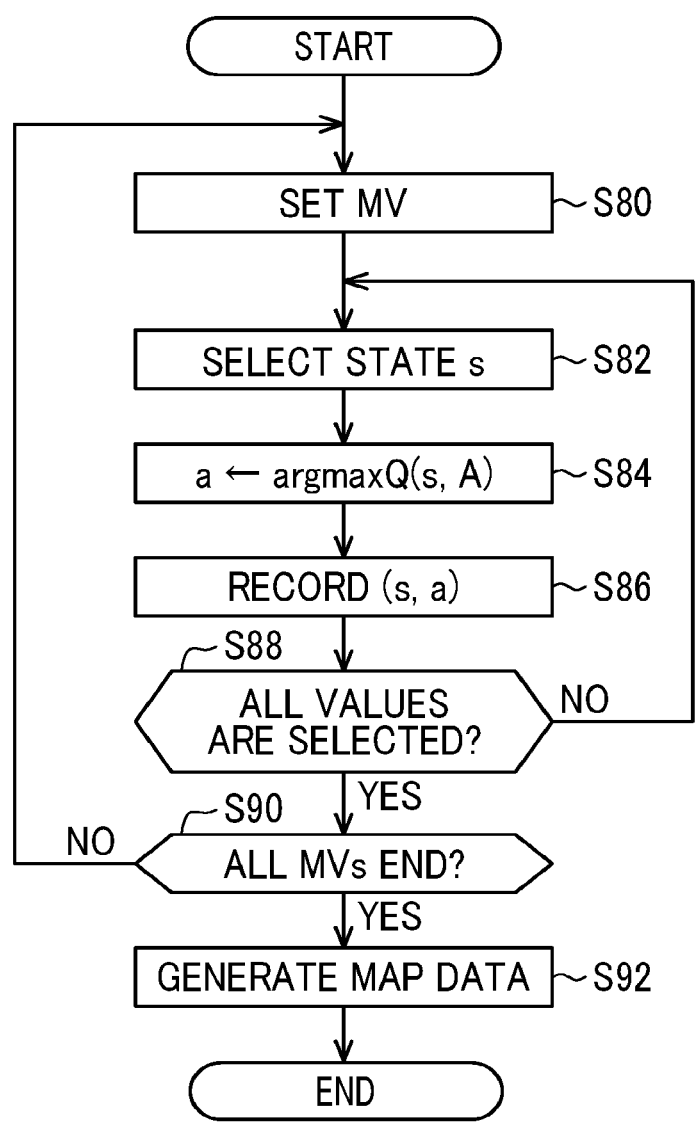
FIG. 6 is a flowchart showing a procedure of map data generation processing according to the first embodiment.

When affirmative determination is made in the processing of S54, the CPU 112 ends a series of processing shown in FIG. 4 once. FIG. 6 shows a procedure of processing for generating the map data DM based on the action value function Q learned through, particularly, the processing of FIG. 4 in the processing executed by the generation device 110. The processing shown in FIG. 6 is implemented by the CPU 112 executing the learning program 114a stored in the ROM 114.

In a series of processing shown in FIG. 6, the CPU 112 first sets one value of the mode variable MV (S80). Next, the CPU 112 selects one of a plurality of states s to be the values of the input variable of the map data DM (S82). Next, the CPU 112 selects an action a corresponding to the state s and maximizing the value of the action value function Q in the action value function Q(s,A) relating to the mode set through the processing of S80 (S84). That is, here, the action a is selected by a greedy policy. Next, the CPU 112 stores a set of the state s and the action a in the memory 116 in association with the value of the mode variable MV set through the processing of S80 (S86).

Next, the CPU 112 determines whether or not all values set as the values of the input variable of the map data DM are selected through the processing of S80 (S88). Then, when determination is made that the unselected value is present (S88: NO), the CPU 112 returns to the processing of S82. In contrast, when determination is made that all values are selected (S88: YES), the CPU 112 determines whether or not affirmative determination is made in the processing of S88 on all possible values of the mode variable MV (S90). Then, when determination is made that the value of the mode variable MV on which affirmative determination is not yet made in the processing of S88 is present (S90: NO), the CPU 112 returns to the processing of S80 and sets the value of the mode variable MV. In contrast, when determination is made that affirmative determination is made in the processing of S88 on all mode variables MV (S90: YES), the CPU 112 generates the map data DM based on data stored through the processing of S86 (S92). Here, the value of the output variable corresponding to the value of the input variable of the map data DM being the state s is set to the corresponding action a.

When the processing of S92 is completed, the CPU 112 ends a series of processing shown in FIG. 6 once. Here, the operation and the effects of the embodiment will be described.

In the system shown in FIG. 3, the CPU 112 learns the action value function Q through reinforcement learning. Then, when the value of the action value function Q is converged, it is assumed that an appropriate action is learned in order to satisfy the traveling control mode. Then, the CPU 112 selects an action maximizing the action value function Q on each state to be the input variable of the map data DM and stores a set of the state and the action in the memory 116. Next, the CPU 112 generates the map data DM based on a set of the state and the action stored in the memory 116. With this, it is possible to set the appropriate throttle valve opening degree command value TA* and retardation amount aop according to the accelerator operation amount PA without causing an excessive increase in man-hours of an expert.

In particular, in the embodiment, a way of providing a reward r is changed for each value of the mode variable MV. Specifically, for example, even though the absolute value of the difference between the torque Trq and the torque command value Trq* in the sports mode is equal to or less than the specified amount ΔTrq for a normal mode, when the absolute value of the difference is greater than the specified amount ATrq for a sports mode, the CPU 112 provides a negative reward. With this, in the sports mode, the action a capable of making actual torque Trq follow the torque command value Trq* according to the accelerator operation amount PA earlier than in the normal mode can obtain a large reward, and the value of the action value function Q corresponding to the action a capable of increasing the response performance of the vehicle is updated to a greater value than in the normal mode.

Accordingly, appropriate relationship definition data DR1 to DR3 according to the mode can be learned. According to the embodiment described above, the following advantageous effects are further obtained. (1) In the memory 76 of the control device 70, the map data DM is stored instead of the action value function Q and the like. With this, since the CPU 72 sets the throttle valve opening degree command value TA* or the retardation amount aop based on map calculation using the map data DM, it is possible to reduce a calculation load compared to when processing for selecting the action value function Q having a maximum value is executed.

(2) The time-series data of the accelerator operation amount PA is included in the independent variable of the action value function Q. With this, the value of the action a can be finely adjusted for various changes in accelerator operation amount PA compared to when solely a single sampling value related to the accelerator operation amount PA is used as an independent variable.

(3) The throttle valve opening degree command value TA* itself is included in the independent variables of the action value function Q. With this, for example, the degree of freedom of exploration through reinforcement learning is easily increased compared to when a parameter or the like of a model expression modeling the behavior of the throttle valve opening degree command value TA* is used as an independent variable relating to the throttle valve opening degree.

Second Embodiment

Hereinafter, a second embodiment will be described referring to the drawings focusing differences from the first embodiment.

Figure 7:
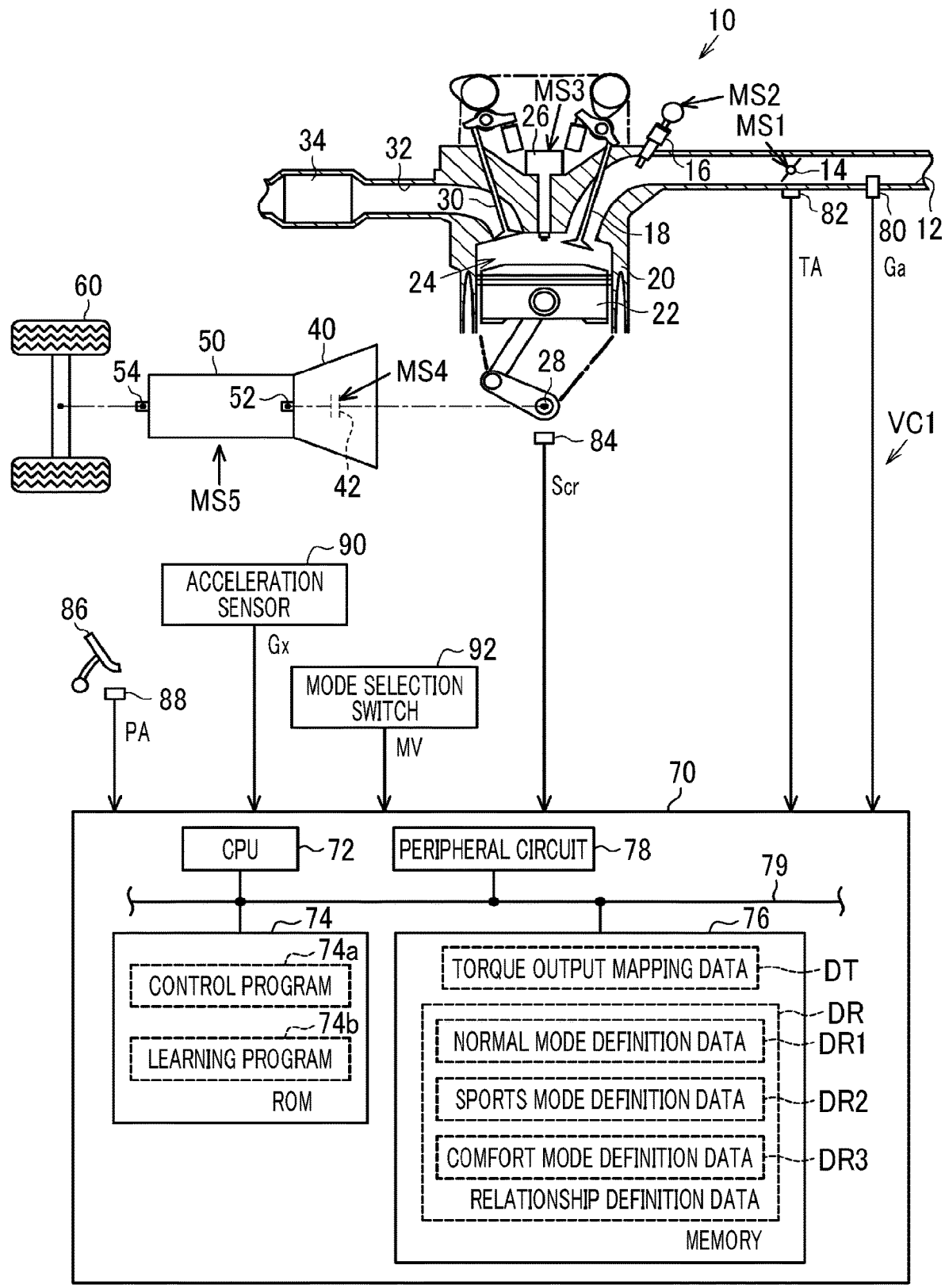
FIG. 7 is a diagram showing a control device and a drive system according to a second embodiment.

FIG. 7 shows a drive system and a control device of the vehicle VC1 according to the embodiment. In FIG. 7, members corresponding to the members shown in FIG. 1 are represented by the same reference numerals for conveniences.

As shown in FIG. 7, in the embodiment, a learning program 74b is stored in the ROM 74 in addition to the control program 74a. In the memory 76, the map data DM is not stored; instead, the relationship definition data DR is stored and torque output mapping data DT is stored. Here, the relationship definition data DR is learned data learned through the processing of FIG. 4. Torque output mapping data defined by the torque output mapping data DT is data relating to a learned model of a neural network or the like that outputs the torque Trq with the rotation speed NE, filling efficiency rl, and the ignition timing as inputs. The torque output mapping data DT should be learned, for example, with the torque Trq acquired through the processing of S38 as training data in executing the processing of FIG. 4.

Figure 8:
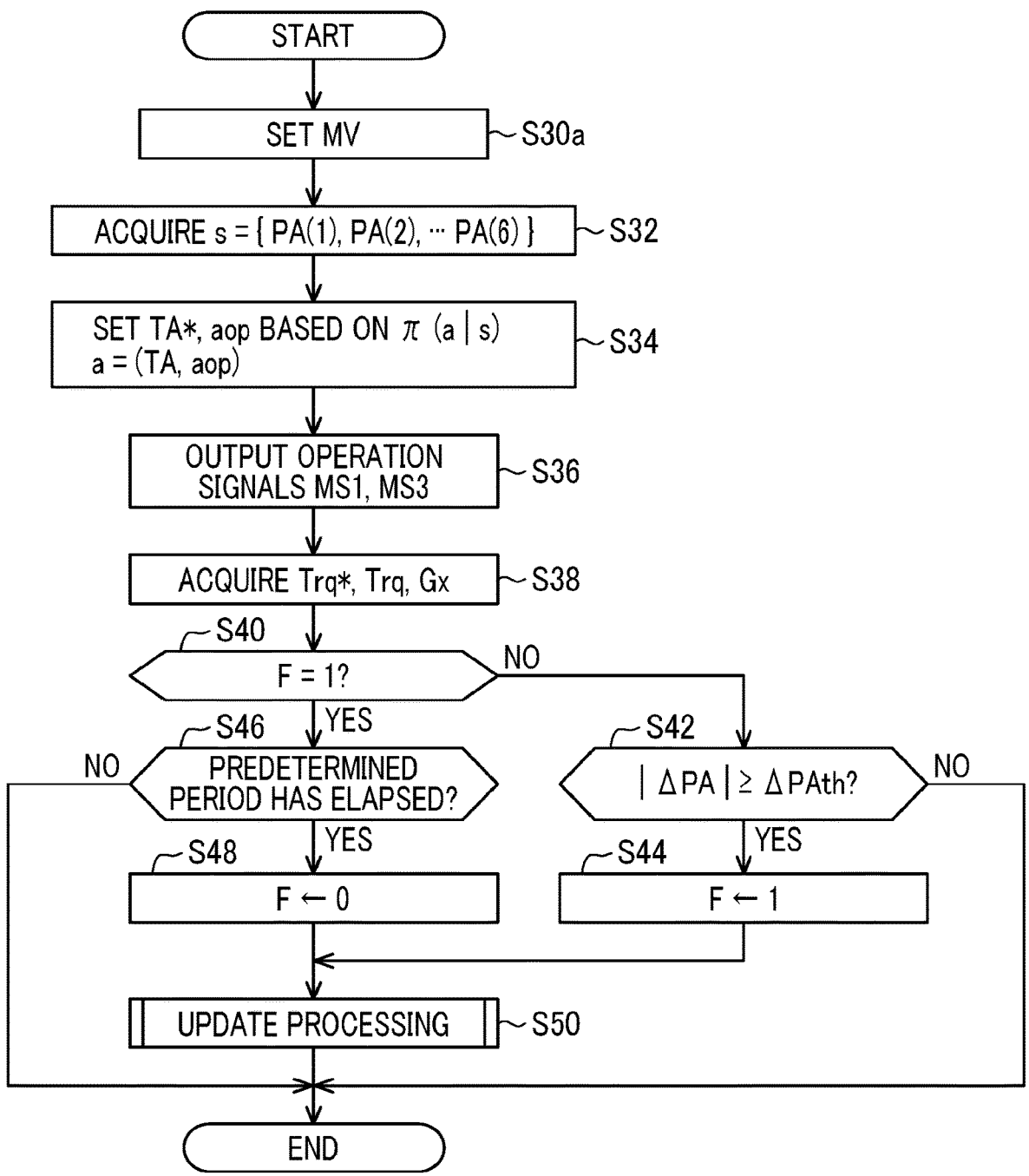
FIG. 8 is a flowchart showing a procedure of processing that is executed by the control device according to the second embodiment.

FIG. 8 shows a procedure of processing that is executed by the control device 70 according to the embodiment. The processing shown in FIG. 8 is implemented by the CPU 72 repeatedly executing the control program 74a and the learning program 74b stored in the ROM 74, for example, in a predetermined cycle. In FIG. 8, processing corresponding to the processing shown in FIG. 4 is represented by the same step numbers for convenience.

In a series of processing shown in FIG. 8, the CPU 72 first acquires the value of the mode variable MV according to the operation of the mode selection switch 92 (S30a). Then, the CPU 72 executes the same processing as the processing of S32 to S50 of FIG. 4. When negative determination is made in the processing of S42 or S46 or when the processing of S50 is completed, the CPU 72 ends a series of processing shown in FIG. 8 once. Incidentally, the processing of S30a and S32 to S48 is implemented by the CPU 72 executing the control program 74a, and the processing of S50 is implemented by the CPU 72 executing the learning program 74b.

In this way, according to the embodiment, the relationship definition data DR and the learning program 74b are mounted in the control device 70, whereby it is possible to improve a learning frequency compared to the first embodiment.

Third Embodiment

Hereinafter, a third embodiment will be described referring to the drawings focusing differences from the second embodiment.

Figure 9:
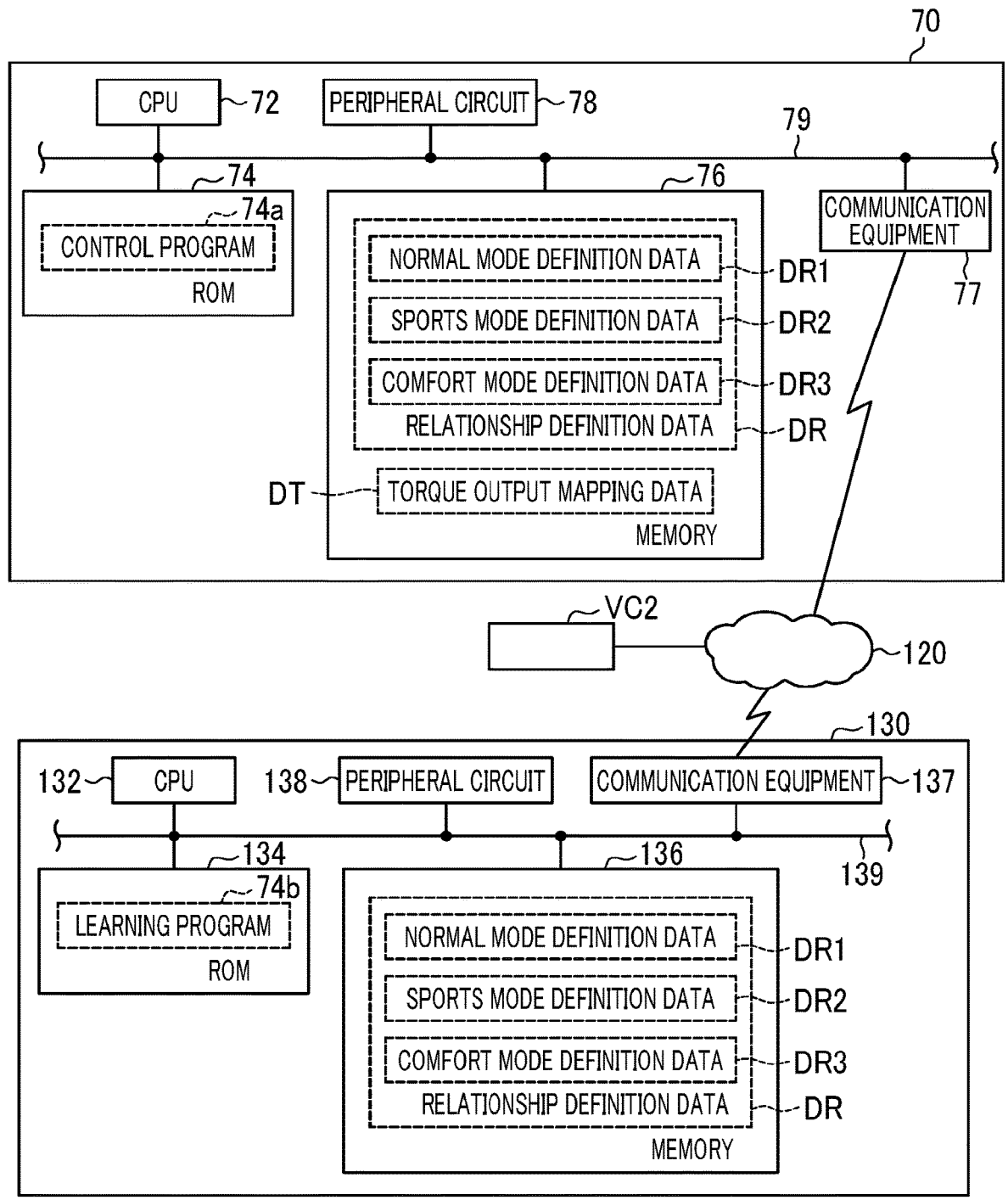
FIG. 9 is a diagram showing the configuration of a system according to a third embodiment; and A portion (a) in FIG. 10 and a portion (b) in FIG. 10 are flowcharts showing a procedure of processing that is executed by the system according to the third embodiment.

In the embodiment, the relationship definition data DR is updated outside the vehicle VC1. FIG. 9 shows the configuration of a control system that executes reinforcement learning in the embodiment. In FIG. 9, members corresponding to the members shown in FIG. 1 are represented by the same reference numerals for convenience.

The ROM 74 in the control device 70 in the vehicle VC1 shown in FIG. 9 stores the control program 74a, but does not store the learning program 74b. The control device 70 includes communication equipment 77. The communication equipment 77 is equipment for communication with a data analysis center 130 through an external network 120 of the vehicle VC1.

The data analysis center 130 analyzes data transmitted from a plurality of vehicles VC1, VC2, . . . . The data analysis center 130 comprises a CPU 132, a ROM 134, an electrically rewritable nonvolatile memory (memory 136), a peripheral circuit 138, and communication equipment 137, and the units are communicable through a local network 139. The ROM 134 stores the learning program 74b, and the memory 136 stores the relationship definition data DR.

Figure 10:
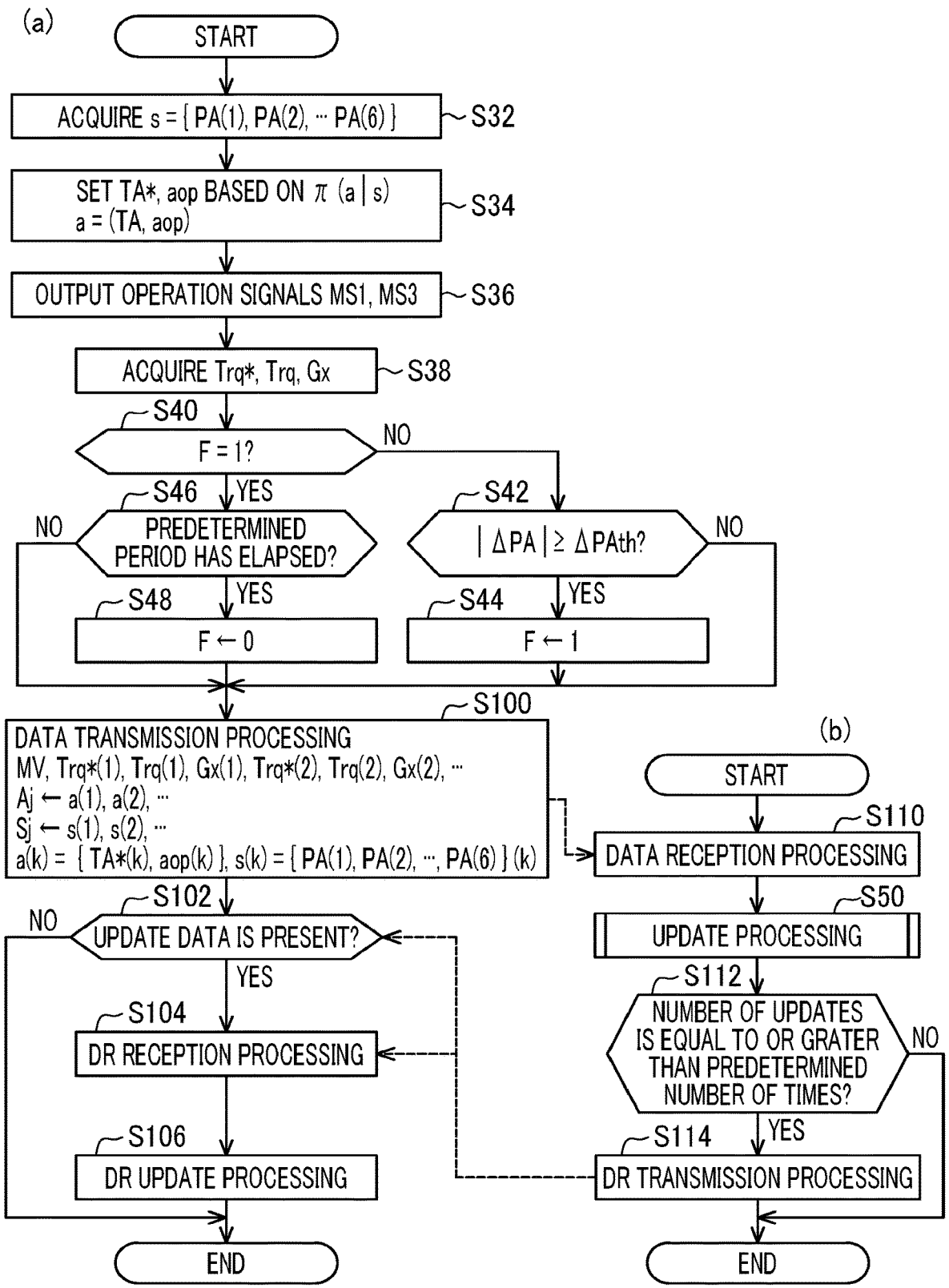

FIG. 10 shows a processing procedure of reinforcement learning according to the embodiment. Processing shown in a portion (a) in FIG. 10 is implemented by the CPU 72 executing the control program 74a stored in the ROM 74 shown in FIG. 9. Processing shown in a portion (b) in FIG. 10 is implemented by the CPU 132 executing the learning program 74b stored in the ROM 134. Processing in FIG. 10 corresponding to the processing shown in FIG. 8 is represented by the same step numbers for convenience. In the following description, the processing shown in FIG. 10 will be described in time series of reinforcement learning.

In a series of processing shown in the portion (a) in FIG. 10, after executing the processing of S32 to S48, the CPU 72 operates the communication equipment 77 to transmit data needed for the update processing of the relationship definition data DR (S100). Here, data to be transmitted includes the value of the mode variable MV, the time-series data of the torque command value Trq*, the torque Trq, and the acceleration Gx, the state set Sj, and the action set Aj in an episode ended immediately before the processing of S44 or S48 is executed.

In contrast, as shown in the portion (b) in FIG. 10, the CPU 132 receives the transmitted data (S110), and updates the relationship definition data DR based on the received data (S50). Then, the CPU 132 determines whether or not the number of update times of the relationship definition data DR is equal to or greater than a predetermined number of times (S112), and when determination is made that the number of update times of the relationship definition data DR is equal to or greater than a predetermined number of times (S112: YES), operates the communication equipment 137 to transmit the relationship definition data DR to the vehicle VC1 that transmits data received through the processing of S110 (S114). When the processing of S114 is completed or when negative determination is made in the processing of S112, the CPU 132 ends a series of processing shown in the portion (b) in FIG. 10 once.

In contrast, as shown in the portion (a) in FIG. 10, the CPU 72 determines whether or not update data is present (S102), and when determination is made that update data is present (S102: YES), receives updated relationship definition data DR (S104). Then, the CPU 72 rewrites the relationship definition data DR for use in the processing of S34 with the received relationship definition data DR (S106). When the processing of S106 is completed or when negative determination is made in the processing of S102, the CPU 72 ends a series of processing shown in the portion (a) in FIG. 10 once.

In this way, according to the embodiment, since the update processing of the relationship definition data DR is executed outside the vehicle VC1, it is possible to reduce a calculation load of the control device 70.

Correspondence Relationship

The correspondence relationship between the matters in the above-described embodiments and the disclosure is as follows.

A processor and a memory in the disclosure correspond to the CPU 72, and the ROM 74 and the memory 76 in FIGS. 1 and 7, respectively, correspond to the CPU 112, and the ROM 114 and the memory 116 in FIG. 3, respectively, and correspond to the CPUs 72, 132, and the ROMs 74, 134 and the memories 76, 136 in FIG. 9, respectively. Operation processing corresponds to the processing of S36, and acquisition processing corresponds to the processing of S32, S38. Reward calculation processing corresponds to the processing of S62 to S66. Update processing corresponds to the processing of S68 to S74. A difference of the traveling control mode is determined by the mode variable MV. A variable relating to an opening degree in the disclosure corresponds to the throttle valve opening degree command value TA*. Time-series data in the disclosure corresponds to the accelerator operation amounts PA(1), PA(2), . . . PA(6). Control mapping data in the disclosure corresponds to the map data DM. A processor corresponds to the CPU 112 and the ROM 114. A processor and a memory in the disclosure correspond to the CPU 72, and the ROM 74 and the memory 76 in FIG. 7, respectively. Acquisition processing corresponds to the processing of S30a, S32, S38. A first processor in the disclosure corresponds to the CPU 72 and the ROM 74, and a second processor corresponds to the CPU 132 and the ROM 134.

Other Embodiments

The embodiment can be modified as follows. The embodiment and the following modification examples can be combined as long as no technical contradiction arises.

Traveling Control Mode

In the above-described embodiments, although the vehicle configured to select one of the three traveling control modes of the sports mode, the normal mode, and the comfort mode has been exemplified in a descending order of the responsiveness of the vehicle to the accelerator operation, the disclosure is not limited thereto. For example, in regard to the responsiveness, instead of the three kinds of performance, two kinds of performance may be selectable or four or more kinds of performance may be selectable.

The traveling control mode of the vehicle is not limited to performance from a viewpoint of the responsiveness. For example, performance from a viewpoint of a fuel consumption rate or an energy consumption rate may be applied.

Action Variable

In the above-described embodiments, although the throttle valve opening degree command value TA* is exemplified as the variable relating to the opening degree of the throttle valve as the action variable, the disclosure is not limited thereto. For example, the responsiveness of the throttle valve opening degree command value TA* to the accelerator operation amount PA may be expressed by a wasteful time and a second-order lag filter, and three variables in total including the wasteful time and two variables defining the second-order lag filter may be used as the variable relating to the opening degree of the throttle valve. In this case, it is desirable that a state variable is a change amount per unit time of the accelerator operation amount PA instead of the time-series data of the accelerator operation amount PA.

In the above-described embodiments, although the retardation amount aop is exemplified as the variable relating to the ignition timing as the action variable, the disclosure is not limited thereto. For example, the ignition timing itself to be corrected through the KCS may be used.

In the above-described embodiments, although the variable relating to the opening degree of the throttle valve and the variable relating to the ignition timing are exemplified as the action variable, the disclosure is not limited thereto. For example, a fuel injection amount may be used in addition to the variable relating to the opening degree of the throttle valve and the variable relating to the ignition timing. In regards to the three values, solely the variable relating to the opening degree of the throttle valve and the fuel injection amount may be employed as the action variable, or solely the variable relating to the ignition timing and the fuel injection amount may be employed. In regards to the three values, solely one value may be employed as the action variable.

As described in a column "Internal Combustion Engine", in a compression ignition type internal combustion engine, a variable relating to an injection amount may be used instead of the variable relating to the opening degree of the throttle valve, and a variable relating to an injection timing may be used instead of the variable relating to the ignition timing. It is desirable that a variable relating to the number of injections in one combustion cycle or a variable relating to a time interval between an end timing of one of two adjacent fuel injections in time series and a start timing of the other fuel injection for one cylinder in one combustion cycle are added in addition to the variable relating to the injection timing.

For example, when the transmission 50 is a stepped transmission, a current value or the like of a solenoid valve that adjusts an engagement state of a clutch by hydraulic pressure may be used as an action variable. Alternatively, for example, as described in the column "Vehicle", when a hybrid vehicle, an electric vehicle, or a fuel cell vehicle is employed as a vehicle, torque or an output of a rotating electric machine may be used as an action variable. For example, when an in-vehicle air-conditioning device including a compressor that rotates with rotational power of a crankshaft of an internal combustion engine is provided, load torque of the compressor may be included in the action variable. When an electric in-vehicle air-conditioning device is provided, the power consumption of the air-conditioning device may be included in the action variable.

State

In the above-described embodiments, although the time-series data of the accelerator operation amount PA is data including the six values sampled at regular intervals, the disclosure is not limited thereto. Data including two or more sampling values at different sampling timings should be used, and in this case, it is more desirable that data including three or more sampling values or data with the regular sampling interval is used.

A state variable relating to the accelerator operation amount is not limited to the time-series data of the accelerator operation amount PA, and for example, as described in the column "Action Variable", the change amount per unit time of the accelerator operation amount PA, or the like may be used.

For example, as described in the column "Action Variable", when the current value of the solenoid valve is the action variable, a rotation speed of the input shaft 52 or a rotation speed of the output shaft 54 of the transmission, and hydraulic pressure that is adjusted by the solenoid valve may be included in the state. Alternatively, as described in the column "Action Variable", when the torque or the output of the rotating electric machine is the action variable, a charging rate or a temperature of the battery may be included in the state. For example, as described in the column "Action Variable", when the load torque of the compressor or the power consumption of the air-conditioning device is included in the action, a temperature in the vehicle cabin may be included in the state.

Dimension Reduction of Data in Table Format

A dimension reduction method of data in a table format is not limited to that illustrated in the above-described embodiments. For example, since the accelerator operation amount PA rarely becomes a maximum value, the action value function Q is not defined on a state for which the accelerator operation amount PA becomes equal to or greater than a specified amount, and the throttle valve opening degree command value TA* and the like when the accelerator operation amount PA becomes equal to or greater than the specified amount may be separately adapted. For example, dimension reduction may be performed by excluding a value with the throttle valve opening degree command value TA* equal to or greater than a specified value from the possible values of the action.

Until affirmative determination is made in the processing of S52 of FIG. 4, in the processing of S34, the values of the independent variables of the action value function Q are limited to a small number, and when affirmative determination is made in the processing of S52, the value near the action a increasing the value of the action value function Q may be added to the possible values of the independent variables of the action value function Q to repeatedly execute the processing of S32 to S52.

Of course, dimension reduction is not indispensable. For example, in a case where reinforcement learning is performed based on data from a plurality of vehicles in the third embodiment and the calculation ability of the CPU 72 or the storage capacity of the memory 76 is sufficient, while the action value function is learned on solely a part subjected to dimension reduction before shipment of the vehicle, all actions may be executable by exploration after shipment. With this, in view of the consideration that sufficient data for learning can be secured after shipment compared to before shipment, the number of possible actions as exploration increases, whereby a more appropriate action can be found.

Relationship Definition Data

In the above-described embodiments, although the action value function Q is a function in a table format, the disclosure is not limited thereto. For example, a function approximator may be used.

For example, the policy $\pi$ may be expressed by a function approximator with the state s and the action a as independent variables and the probability of taking the action a as a dependent variable instead of using the action value function Q, and parameters that determine the function approximator may be updated according to the reward r.

Operation Processing

For example, as described in the column "Relationship Definition Data", when the action value function is the function approximator, the action a maximizing the action value function Q should be selected by inputting all sets of discrete values on the action to be the independent variable of the function in a table format in the above-described embodiment to the action value function Q along with the state s.

For example, as described in the column "Relationship Definition Data", in a case where the policy $\pi$ is the function approximator having the state s and the action a as the independent variables and the probability of taking the action a as the dependent variable, the action a should be selected based on the probability indicated by the policy $\pi$.

Update Mapping

In the processing of S68 to S74, although a case where the $\varepsilon$-soft on-policy type Monte Carlo method is used is exemplified, the disclosure is not limited thereto. For example, an off-policy Monte Carlo method may be used. Of course, the disclosure is not limited to the Monte Carlo method, for example, an off-policy type TD method may be used, an on-policy type TD method, such as a SARSA method may be used, or eligibility trace method may be used as on-policy type learning.

For example, as described in the column "Relationship Definition Data", when the policy $\pi$ is expressed using the function approximator, and the policy $\pi$ is updated directly based on the reward r, update mapping may be configured using a policy gradient method or the like.

A target to be directly updated based on the reward r is not limited to any one of the action value function Q and the policy $\pi$. For example, like an actor-critic method, the action value function Q and the policy $\pi$ may be updated. In the actor-critic method, the target to be updated is not limited thereto, and for example, a value function V may be a target to be updated instead of the action value function Q.

"ε" that determines the policy π is not limited to a fixed value, and may be changed according to a rule determined in advance according to a degree of progress of learning.

Reward Calculation Processing

In the processing of FIG. 5, although the reward is provided according to whether or not the logical product of the condition (A) and the condition (B) is true, the disclosure is not limited thereto. For example, processing for providing a reward according to whether or not the condition (A) is satisfied and processing for providing a reward according to whether or not the condition (B) is satisfied may be executed. For example, in regards to the two kinds of processing of the processing for providing the reward according to whether or not the condition (A) is satisfied and the processing for providing the reward according to whether or not the condition (B) is satisfied, solely any one kind of processing may be executed.

For example, instead of providing the same reward uniformly when the condition (A) is satisfied, processing for providing a greater reward when an absolute value of the difference between the torque Trq and the torque command value Trq* is small than when the absolute value is large may be applied. For example, instead of providing the same reward uniformly when the condition (A) is not satisfied, processing for providing a smaller reward when the absolute value of the difference between the torque Trq and the torque command value Trq* is large than when the absolute value is small may be applied. Then, in the cases, the magnitude of the reward to be provided may be changed according to the value of the mode variable MV.

For example, instead of providing the same reward uniformly when the condition (B) is satisfied, processing for making the magnitude of the reward variable according to the magnitude of the acceleration Gx may be applied. For example, instead of providing the same reward uniformly when the condition (B) is not satisfied, processing for making the magnitude of the reward variable according to the magnitude of the acceleration Gx may be applied. Then, in the cases, the magnitude of the reward to be provided may be changed according to the value of the mode variable MV.

For example, as described in the column "Action Variable", when the current value of the solenoid valve of the transmission 50 is the action variable, for example, at least one of the following three kinds of processing (a) to (c) may be included in the reward calculation processing.

(a) Processing for providing a greater reward when a time needed for switching a gear ratio in the transmission is within a predetermined time than when the time exceeds the predetermined time (b) Processing for providing a greater reward when an absolute value of a change rate of the rotation speed of the input shaft 52 of the transmission is equal to or less than an input-side predetermined value than when the absolute value exceeds the input-side predetermined value.

(c) Processing for providing a greater reward when an absolute value of a change rate of the rotation speed of the output shaft 54 of the transmission is equal to or less than an output-side predetermined value than when the absolute value exceeds the output-side predetermined value In such a case, for example, when the traveling control mode focused on responsiveness, such as the sports mode, is selected, the predetermined time should be set to be shorter, and the input-side predetermined value or the output-side predetermined value should be set to a greater value.

For example, as described in the column "Traveling Control Mode", when the traveling control mode is defined from a viewpoint of a fuel consumption rate or an energy consumption rate, processing for providing a greater reward when the fuel consumption rate or the energy consumption rate is low than when the fuel consumption rate or the energy consumption rate is high should be executed. In this case, as described in the column "Action Variable", when the in-vehicle air-conditioning device is provided, the load torque or power consumption of the in-vehicle air-conditioning device may be included in the action variable.

For example, as described in the column "Action Variable", when the torque or the output of the rotating electric machine is the action variable, processing for providing a greater reward when the charging rate of the battery is within a predetermined range than when the charging rate of the battery is out of the predetermined range or processing for providing a greater reward when the temperature of the battery is within a predetermined range than when the temperature of the battery is out of the predetermined range may be included. For example, as described in the column "Action Variable", when the load torque of the compressor or the power consumption of the air-conditioning device is included in the action variable, processing for providing a greater reward when the temperature in the vehicle cabin is within a predetermined range than when the temperature in the vehicle cabin is out of the predetermined range may be added.

Method of Generating Vehicle Control Data

In the processing of S34 of FIG. 4, although an action is decided based on the action value function Q, the disclosure is not limited thereto, and all possible actions may be selected with the same probability.

Control Mapping Data

The control mapping data with the state of the vehicle as an input variable and the value of the action variable maximizing the expected return as an output variable generated by associating the state of the vehicle with the value of the action variable maximizing the expected return on a one-to-one basis is not limited to map data. For example, a function approximator may be applied. This can be expressed in such a manner that, for example, as described in the column "Update Mapping", when the policy gradient method or the like is used, the policy π is expressed by a Gaussian distribution indicating the probability capable of taking the value of the action variable, the average value of the Gaussian distribution is expressed by the function approximator, the parameters of the function approximator expressing the average value are updated, and the average value after learning is set as control mapping data.

Acquisition Processing

In the above-described embodiments, although the selection result of the traveling control mode of the user is acquired by acquiring the mode variable MV based on the output signal of the mode selection switch 92, the disclosure is not limited thereto. For example, a device configured to sense a voice instruction may be provided instead of the mode selection switch 92, and a sensing result of the device may be acquired as the mode variable MV.

Vehicle Control System

In the example shown in FIG. 10, although the processing (the processing of S34) for deciding the action based on the policy π is executed on the vehicle side, the disclosure is not limited thereto. For example, data acquired through the processing of S32 may be transmitted from the vehicle VC1, and the data analysis center 130 may decide the action a using the transmitted data and may transmit the decided action to the vehicle VC1.

The vehicle control system is not limited to the vehicle control system constituted of the control device 70 and the data analysis center 130. For example, a portable terminal of the user may be used instead of the data analysis center 130. The vehicle control system may be constituted of the control device 70, the data analysis center 130, and the portable terminal. This can be implemented by the portable terminal executing, for example, the processing of S34.

Processor

The processor is not limited to the processor that includes the CPU 72 (112, 132) and the ROM 74 (114, 134), and executes software processing. For example, a dedicated hardware circuit, such as an ASIC, in which at least a part of the processing executed by the software in the above-described embodiments is executed by hardware, may be provided. That is, the processor should have a configuration of any one of (a) to (c) described below. (a) A processing device that executes the entire processing in compliance with a program, and a program storage device that stores the program, such as a ROM, are provided. (b) A processing device that executes a part of the processing in compliance with a program, a program storage device, and a dedicated hardware circuit that executes the remaining processing are provided. (c) A dedicated hardware circuit that executes the entire processing is provided. Here, a plurality of software processors including the processing device and the program storage device or a plurality of dedicated hardware circuits may be provided.

Memory

In the above-described embodiments, although the memory that stores the relationship definition data DR and the memory (ROM 74, 114, 134) that stores the learning program 74b, 114a or the control program 74a are separate memories, the disclosure is not limited thereto.

Internal Combustion Engine

The internal combustion engine is not limited to an internal combustion engine including a port injection valve configured to inject fuel to the intake passage 12 as the fuel injection valve, and may be an internal combustion engine including an in-cylinder injection valve configured to inject fuel directly to the combustion chamber 24 or may be, for example, an internal combustion engine including both of a port injection valve and an in-cylinder injection valve.

The internal combustion engine is not limited to a spark ignition type internal combustion engine, and may be, for example, a compression ignition type internal combustion engine or the like using diesel oil or the like as fuel.

Vehicle

The vehicle is not limited to a vehicle in which a thrust generation device is solely an internal combustion engine, and may be, for example, a so-called hybrid vehicle that includes an internal combustion engine and a rotating electric machine. The vehicle may be a so-called electric vehicle or a fuel cell vehicle that does not include an internal combustion engine and includes a rotating electric machine as a thrust generation device.

What is claimed is:

1. A method of generating vehicle control data that is applied to a vehicle configured to select one of a plurality of traveling control modes and is executed by a processor in a state in which relationship definition data defining a relationship between a state of the vehicle and an action variable as a variable relating to an operation of electronic equipment in the vehicle is stored in a memory, the method comprising:

operation processing for operating the electronic equipment;

acquisition processing for acquiring a detection value of a sensor configured to detect the state of the vehicle;

reward calculation processing for providing, based on the detection value acquired through the acquisition processing, a greater reward when a characteristic of the vehicle having correlation with the traveling control modes satisfies a criterion than when the characteristic of the vehicle does not satisfy the criterion; and update processing for updating the relationship definition data with the state of the vehicle, a value of the action variable used for the operation of the electronic equipment, and the reward given according to the operation based on the detection value acquired through the acquisition processing as inputs to update mapping determined in advance, wherein:

the processor is configured to, based on the update mapping, output the relationship definition data updated to increase an expected return on the reward when the electronic equipment is operated in compliance with the relationship definition data;

the reward calculation processing includes processing for providing a reward such that the reward provided when the selected traveling control mode is a first traveling control mode is different from the reward provided when the selected traveling control mode is a second traveling control mode even though the characteristic of the vehicle satisfies the same criterion, the first traveling control mode being different from the second traveling control mode;

a change in accelerator operation amount is included in the state of the vehicle;

the reward calculation processing includes processing for providing a greater reward when a front-rear direction acceleration of the vehicle accompanied by the change in accelerator operation amount satisfies a criterion than when the acceleration does not satisfy the criterion, and providing different rewards between the first traveling control mode and the second traveling control mode among the traveling control modes even though the acceleration satisfies the same criterion;

the vehicle includes an internal combustion engine as a thrust generation device of the vehicle;

a throttle valve of the internal combustion engine is included in the electronic equipment; and a variable relating to an opening degree of the throttle valve is included in the action variable.

2. The method according to claim 1, wherein:

an ignition device of the internal combustion engine is included in the electronic equipment; and a variable relating to an ignition timing is included in the action variable.

3. The method according to claim 1, wherein the relationship definition data is data that defines a relationship between time-series data of the accelerator operation amount and the action variable.

4. The method according to claim 1, wherein:

the processor is configured to execute processing for generating control mapping data by associating the state of the vehicle with the value of the action variable maximizing the expected return based on the relationship definition data updated through the update processing on a one-to-one basis; and the control mapping data includes the value of the action variable maximizing the state of the vehicle as an input and the expected return as an output.

5. A vehicle control device that is applied to a vehicle configured to select one of a plurality of traveling control modes, the vehicle control device comprising:

a memory and a processor mounted in the vehicle, wherein:
the processor is configured to execute
operation processing for operating electronic equipment;
acquisition processing for acquiring a detection value of a sensor configured to detect a state of the vehicle;
reward calculation processing for providing, based on the detection value acquired through the acquisition processing, a greater reward when a characteristic of the vehicle having correlation with the traveling control modes satisfies a criterion than when the characteristic of the vehicle does not satisfy the criterion; and
update processing for updating relationship definition data with the state of the vehicle, a value of an action variable used for the operation of the electronic equipment, and the reward given according to the operation based on the detection value acquired through the acquisition processing as inputs to update mapping determined in advance, wherein:
the processor is configured to, based on the update mapping, output the relationship definition data updated to increase an expected return on the reward when the electronic equipment is operated in compliance with the relationship definition data;
the reward calculation processing includes processing for providing a reward such that the reward provided when the selected traveling control mode is a first traveling control mode is different from the reward provided when the selected traveling control mode is a second traveling control mode even though the characteristic of the vehicle satisfies the same criterion, the first traveling control mode being different from the second traveling control mode;
a change in accelerator operation amount is included in the state of the vehicle;
the reward calculation processing includes processing for providing a greater reward when a front-rear direction acceleration of the vehicle accompanied by the change in accelerator operation amount satisfies a criterion than when the acceleration does not satisfy the criterion, and providing different rewards between the first traveling control mode and the second traveling control mode among the traveling control modes even though the acceleration satisfies the same criterion;
the vehicle includes an internal combustion engine as a thrust generation device of the vehicle;
a throttle valve of the internal combustion engine is included in the electronic equipment; and
a variable relating to an opening degree of the throttle valve is included in the action variable.

6. The vehicle control device according to claim 5, wherein:
an ignition device of the internal combustion engine is included in the electronic equipment; and
a variable relating to an ignition timing is included in the action variable.

7. The vehicle control device according to claim 5, wherein the relationship definition data is data that defines a relationship between time-series data of the accelerator operation amount and the action variable.

8. The vehicle control device according to claim 5, wherein:
the processor is configured to execute processing for generating control mapping data by associating the state of the vehicle with the value of the action variable maximizing the expected return based on the relationship definition data updated through the update processing on a one-to-one basis; and
the control mapping data includes the value of the action variable maximizing the state of the vehicle as an input and the expected return as an output.

9. The vehicle control device according to claim 5, wherein:
the operation processing includes processing for operating the electronic equipment based on the relationship definition data in compliance with the value of the action variable according to the state of the vehicle; and
the acquisition processing includes processing for acquiring a selection result regarding which of the traveling control modes is selected by a user.

10. A vehicle control system that is applied to a vehicle configured to select one of a plurality of traveling control modes, the vehicle control system comprising:
a memory and
a processor mounted in the vehicle, wherein:
the processor is configured to execute
operation processing for operating electronic equipment;
acquisition processing for acquiring a detection value of a sensor configured to detect a state of the vehicle;
reward calculation processing for providing, based on the detection value acquired through the acquisition processing, a greater reward when a characteristic of the vehicle having correlation with the traveling control modes satisfies a criterion than when the characteristic of the vehicle does not satisfy the criterion; and
update processing for updating relationship definition data with the state of the vehicle, a value of an action variable used for the operation of the electronic equipment, and the reward given according to the operation based on the detection value acquired through the acquisition processing as inputs to update mapping determined in advance, wherein:
the processor is configured to, based on the update mapping, output the relationship definition data updated to increase an expected return on the reward when the electronic equipment is operated in compliance with the relationship definition data;
the reward calculation processing includes processing for providing a reward such that the reward provided when the selected traveling control mode is a first traveling control mode is different from the reward provided when the selected traveling control mode is a second traveling control mode even though the characteristic of the vehicle satisfies the same criterion, the first traveling control mode being different from the second traveling control mode;
a change in accelerator operation amount is included in the state of the vehicle;
the reward calculation processing includes processing for providing a greater reward when a front-rear direction acceleration of the vehicle accompanied by the change in accelerator operation amount satisfies a criterion than when the acceleration does not satisfy the criterion, and providing different rewards between the first traveling control mode and the second traveling control mode among the traveling control modes even though the acceleration satisfies the same criterion;
the vehicle includes an internal combustion engine as a thrust generation device of the vehicle;
a throttle valve of the internal combustion engine is included in the electronic equipment; and a variable relating to an opening degree of the throttle valve is included in the action variable.

11. The vehicle control system according to claim 10, wherein:
    an ignition device of the internal combustion engine is included in the electronic equipment; and
    a variable relating to an ignition timing is included in the action variable.

12. The vehicle control system according to claim 10, wherein:
    the processor is configured to execute processing for generating control mapping data by associating the state of the vehicle with the value of the action variable maximizing the expected return based on the relationship definition data updated through the update processing on a one-to-one basis; and
    the control mapping data includes the value of the action variable maximizing the state of the vehicle as an input and the expected return as an output.

13. The vehicle control system according to claim 10, wherein:
    the processor includes a first processor mounted in the vehicle and a second processor different from an in-vehicle device;
    the first processor is configured to execute at least the acquisition processing and the operation processing; and
    the second processor is configured to execute at least the update processing.

* * * * *